(12) United States Patent
Tsuge et al.

(10) Patent No.: US 11,155,257 B2
(45) Date of Patent: Oct. 26, 2021

(54) AUTOMATIC PARKING CONTROL DEVICE

(71) Applicant: HITACHI AUTOMOTIVE SYSTEMS, LTD., Hitachinaka (JP)

(72) Inventors: Munetoshi Tsuge, Hitachinaka (JP); Yoshiyuki Yoshida, Hitachinaka (JP); Masashi Seimiya, Hitachinaka (JP); Keiichiro Hirakawa, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 135 days.

(21) Appl. No.: 16/609,262

(22) PCT Filed: May 22, 2018

(86) PCT No.: PCT/JP2018/019583
§ 371 (c)(1),
(2) Date: Oct. 29, 2019

(87) PCT Pub. No.: WO2019/003720
PCT Pub. Date: Jan. 3, 2019

(65) Prior Publication Data
US 2020/0055514 A1 Feb. 20, 2020

(30) Foreign Application Priority Data
Jun. 26, 2017 (JP) .............................. JP2017-124433

(51) Int. Cl.
*B60W 30/06* (2006.01)
*B60W 30/095* (2012.01)
(Continued)

(52) U.S. Cl.
CPC .......... *B60W 30/06* (2013.01); *B60W 30/095* (2013.01); *B60W 30/10* (2013.01);
(Continued)

(58) Field of Classification Search
CPC .... B60W 30/06; B60W 30/095; B60W 30/10; B62D 15/027; B62D 15/025;
(Continued)

(56) References Cited

U.S. PATENT DOCUMENTS

2005/0027414 A1  2/2005  Iwazaki et al.
2006/0167633 A1*  7/2006  Satonaka ............... G08G 1/168
                                                                    701/300
(Continued)

FOREIGN PATENT DOCUMENTS

DE  10 2008 027779 A1  12/2009
DE  10 2013 103569 A1  10/2013
(Continued)

OTHER PUBLICATIONS

International Search Report dated Jul. 24, 2018 for PCT International Application No. PCT/JP2018/019583.
Extended European Search Report dated Nov. 25, 2020 for European Patent Application No. 18824096.4.

*Primary Examiner* — Jason Holloway
(74) *Attorney, Agent, or Firm* — Volpe Koenig

(57) ABSTRACT

An automatic parking control device is capable of causing a vehicle to correctly reach the next frame without relying on normal parking route regeneration when a determination is made that the vehicle cannot reach the next frame under automatic parking vehicle control along a section route constituting a part of a parking route. When a determination is made whether the next frame is located on an extension of the current section route and the determination result shows that the next frame is located on the extension, the host vehicle travels further. When the determination is made whether the next frame is located on a remaining section of the current section route and the determination result shows that the next frame is located on the remaining section, the
(Continued)

host vehicle decelerates earlier, thereby allowing the host vehicle to reach and come to a stop at the next frame.

10 Claims, 13 Drawing Sheets

(51) Int. Cl.
  *B60W 30/10* (2006.01)
  *B62D 15/02* (2006.01)
  *G05D 1/02* (2020.01)

(52) U.S. Cl.
  CPC ......... *B62D 15/025* (2013.01); *B62D 15/026* (2013.01); *B62D 15/027* (2013.01); *B62D 15/0285* (2013.01); *G05D 1/0212* (2013.01); *B60T 2201/10* (2013.01)

(58) Field of Classification Search
  CPC .............. B62D 15/026; B62D 15/0285; G05D 1/0212; B60T 2201/10
  See application file for complete search history.

(56) References Cited

U.S. PATENT DOCUMENTS

| 2010/0019935 | A1* | 1/2010 | Kawabata | B62D 15/028 340/932.2 |
| 2011/0087406 | A1* | 4/2011 | Barth | B60Q 1/48 701/41 |
| 2015/0032319 | A1* | 1/2015 | Kim | B62D 15/027 701/23 |
| 2015/0321667 | A1* | 11/2015 | Fukata | B60K 28/00 701/70 |
| 2015/0375740 | A1 | 12/2015 | Okamura et al. | |

FOREIGN PATENT DOCUMENTS

| JP | 2001-018821 | A | 1/2001 |
| JP | 2005-014778 | A | 1/2005 |
| JP | 4185957 | B2 | 11/2008 |
| JP | 2011-061975 | A | 3/2011 |
| JP | 2012-084021 | A | 4/2012 |
| JP | 2016-084029 | A | 5/2016 |

* cited by examiner

AUTOMATIC PARKING CONTROL DEVICE

TECHNICAL FIELD

The present invention relates to an automatic parking control device configured to maneuver a vehicle into a target parking position.

BACKGROUND ART

As a conventional technology, known is an automatic parking control device configured to determine a target parking position based on information from an external environment recognition device such as a camera or a sonar, calculate a parking route on which a vehicle travels from the current vehicle position to the target parking position, and control steering, and acceleration and deceleration of the vehicle along the parking route.

The parking route generally contains zero or more times of turning (switching of the travel direction of the vehicle through repeated forward and backward travel). The parking route is calculated as a chain of one or more section routes extending from a vehicle control start position or a turning position to a next turning position or the target parking position (hereinafter, may be referred to as a next frame).

To the control of the steering, and acceleration and deceleration of the vehicle performed by the automatic parking control device, feedback control is typically applied in which a difference between a position on the parking route where the host vehicle is supposed to be located at the current time and the current host vehicle position calculated based on wheel speed logs and steering angle logs is detected, and the host vehicle position is brought closer to the parking route. Such feedback control allows the host vehicle to travel on the parking route.

However, even when the vehicle is caused to travel on each of the section routes constituting the parking route under the feedback control, an end position upon the end of the control may deviate from the next frame of the section route which the vehicle is supposed to reach. The factors behind the above include a case where the position of the next frame is changed due to a result of external environment recognition when the feedback control fails to make a complete correction due to accumulation of errors, external factors, or the like.

As described above, when the end position upon the end of the control along the section route deviates from the next frame, conventionally, the parking route extending from the current position to the target parking position is regenerated, and the vehicle is caused to travel on the parking route thus regenerated.

For example, the following PTL 1 discloses a method in which, when the target parking position is changed or a difference between an actual travel path of the vehicle and the target parking route becomes equal to or greater than a predetermined level, the parking route is regenerated, and even when this condition is satisfied, the host vehicle is caused to travel on the existing parking route to a position where the parking route is easily regenerated.

However, it is required that normal general-purpose route generation processing be applicable to various positional relations between the host vehicle position and the target parking position. Further, when a clothoid curve is applied to some of the parking route, it is required that the parking route be calculated on which the host vehicle is guided without abrupt steering while avoiding stationary steering (steering while the vehicle is at a stop) as much as possible.

Furthermore, in consideration of a case where parking can be made with a plurality of times of turning, consideration needs to be given to minimizing the number of times of turning. As described above, since the normal route generation processing becomes complicated, the processing inevitably takes time. On the other hand, a difference in host vehicle position between when the route generation processing is started and when the route generation processing is completed and the vehicle control is started makes certainty for causing the host vehicle to reach the target parking position with the generated parking route less reliable. Therefore, the route generation processing is generally performed while the vehicle is at a stop.

However, when a determination is made that the vehicle cannot reach the next frame under control along the section route as described above, it is desirable that, without the normal route regeneration, if possible, an adjustment to the parking route or vehicle control to allow the vehicle to reach the next frame be made by light-load processing that can be performed without causing the vehicle to come to a stop.

As a conventional technology that fulfills the above requirement, the following PTL 2 discloses a technology of predicting the stop position of the vehicle based on the speed and position of the vehicle, and, when the stop position thus predicted is located before an allowable range of the target stop position, releasing the brakes to adjust the stop position. However, PTL 2 is intended for a railway whose route is uniquely determined by tracks and does not take into consideration a case where a vehicle deviates from the route.

CITATION LIST

Patent Literature

PTL 1: JP 4185957 B2
PTL 2: JP 2011-61975 A

SUMMARY OF INVENTION

Technical Problem

An automobile or the like does not necessarily travel along the route, unlike the railway. Further, in a case of normal travel on organized roadways, supposed position and orientation of the vehicle are roughly determined based on position and orientation of a travel lane, but in a case of automatic parking, the supposed position and orientation of the vehicle are determined based on only the parking route calculated by the automatic parking control device.

On the other hand, when it is recognized by the external environment recognition that the next frame has moved, there is no parking route to the next frame depending on a destination of the next frame, and it is brought into a state where how to reach the next frame is unknown until the parking route is regenerated.

The present invention has been made in view of the above circumstances, and an object of the present invention is to provide an automatic parking control device capable of causing a vehicle to correctly reach the next frame, without relying on normal parking route regeneration, when a determination is made that the vehicle cannot reach the next frame under automatic parking vehicle control.

Solution to Problem

In order to solve the above problems, an automatic parking control device according to the present invention is configured to cause a vehicle to travel from a parking start position to a target parking position on a parking route extending from the parking start position to the target parking position by traveling on a section route extending from the parking start position or a turning position provided on a way to an end of the parking route to a next turning position or the target parking position, and includes a determination unit configured to determine, while the vehicle is traveling on a certain section route, whether the vehicle can reach a turning position or within a next frame serving as the target parking position which the vehicle is scheduled to reach next when the vehicle travels on a remaining section from a current position on the section route, and, when determining that the vehicle cannot reach within the next frame even after travel to an end of the remaining section, determine whether the vehicle can reach within the next frame on an extension of the remaining section by causing the vehicle to travel further from a travel end position of the remaining section with a steering angle and travel direction at the travel end position of the remaining section kept or determine whether the vehicle can reach within the next frame on a way to the end of the remaining section, a calculation unit configured to calculate an adjustment distance from the current position on the section route or the travel end position to the next frame when the determination unit determines that the vehicle can reach within the next frame, and an adjustment unit configured to generate, based on the adjustment distance calculated by the calculation unit, an adjustment route on which the vehicle is caused to travel to the next frame.

Advantageous Effects of Invention

According to the present invention, under automatic parking vehicle control, when the host vehicle position at the end of the vehicle control along the section route is likely to deviate from the next frame, and the next frame is located on the extension of the section route or on the section route, the determination is made whether the host vehicle can reach the next frame with slight adjustment to light-load processing without regeneration of the parking route, and, when the determination result shows that the host vehicle can reach the next frame, vehicle control reflecting the adjustment is performed to allow the host vehicle to reach and properly come to a stop at the next frame. Further, even when it is recognized that the next frame has moved suddenly due to the influence of the external environment recognition or the like, the host vehicle can properly come to a stop at the next frame. In addition, the normal parking route regeneration processing is not performed, thereby eliminating the need of the stop and in turn reducing a processing load on a central processing unit (CPU).

Problems, components, and effects other than those described above will be apparent from the description of the embodiments given below.

DESCRIPTION OF EMBODIMENTS

Hereinafter, a description will be given of embodiments of the present invention with reference to the drawings.

First Embodiment

Figure 1:
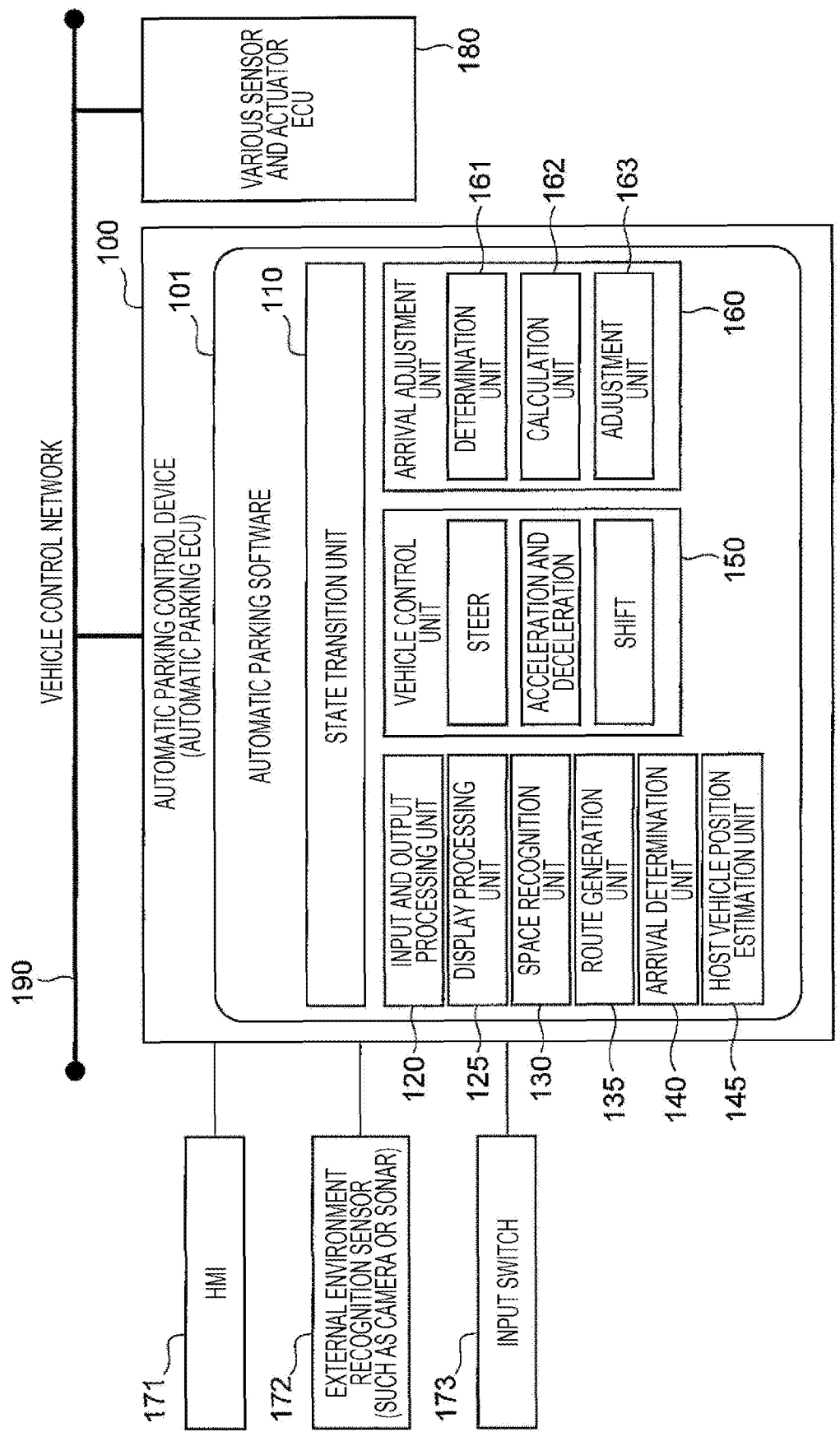
FIG. 1 is a schematic block diagram of an automatic parking control device according to a first embodiment of the present invention.

FIG. 1 is a schematic block diagram of an automatic parking control device according to a first embodiment of the present invention.

An automatic parking control device 100 according to the present embodiment performs all functions related to automatic parking. Note that the automatic parking control device 100 is generally implemented with an electronic circuit and thus is also referred to as an automatic parking electronic control unit (ECU).

The automatic parking control device 100 is connected with a human machine interface (HMI) 171, an external environment recognition sensor 172 such as a camera or a sonar, an input switch 173, and various on-vehicle sensor and actuator ECUs 180 over direct-connected signal lines or a vehicle control network 190 such as a controller area network (CAN). This structure allows the automatic parking control device 100 to perform actions such as acquisition of various types of information such as external environment information, information input from a driver, and a vehicle state; vehicle control; and presentation of information to the driver, and thus to constitute an automatic parking system as a whole.

Various types of processing in the automatic parking control device 100 are performed by automatic parking software 101 operating in the automatic parking control device 100. The automatic parking software 101 includes various software processing units such as a state transition unit 110, an input and output processing unit 120, a display processing unit 125, a space recognition unit 130, a route generation unit 135, an arrival determination unit 140, a host vehicle position estimation unit 145, and a vehicle control unit 150.

The state transition unit 110 controls the overall operation of the automatic parking control device 100, changes its own state based on information from another software processing unit, and determines the next action.

The input and output processing unit 120 performs input and output processing with respect to various devices located outside the automatic parking control device 100, the various devices being are connected to the automatic parking control device 100 over the direct-connected signal lines or the vehicle control network 190. That is, the input and output processing unit 120 performs processing of passing input data received from various devices to another software processing unit and processing of transmitting, to various devices, output data in response to a request from another software processing unit.

The display processing unit 125 manipulates information received from the external environment recognition sensor 172 and information on various operation states received from another software processing unit to convert the pieces of information to data suitable for display on the HMI 171 and outputs the data to the HMI 171.

The space recognition unit 130 recognizes a parking slot, an obstacle, and the like based on the information received from the external environment recognition sensor 172 and the position and orientation of the host vehicle estimated by the host vehicle position estimation unit 145 and creates a space map.

The route generation unit 135 generates a parking route extending from a parking start position (vehicle control start position) to a target parking position based on the space map created by the space recognition unit 130 and an instruction received from the state transition unit 110.

The arrival determination unit 140 determines whether the host vehicle has reached the next frame of the current section route of the parking route generated by the route generation unit 135 based on the position and orientation of the host vehicle estimated by the host vehicle position estimation unit 145. Note that the section route refers to a route extending from the parking start position (vehicle control start position) or a turning position provided on the way to the end of the parking route to the next turning position or the target parking position. In other words, the section route refers to a route extending from the parking start position or any target position to the next target position when the turning position provided on the way to the end of the parking route or the target parking position is defined as the target position. Further, the next frame refers to a turning position or the target parking position (target position) to which the host vehicle will reach next.

The host vehicle position estimation unit 145 estimates the current position and orientation of the host vehicle based on information such as wheel speed logs and steering angle logs of the host vehicle.

The vehicle control unit 150 performs steering control, acceleration and deceleration control, shift control, and the like of the host vehicle to cause the host vehicle to travel on the current section route.

The automatic parking software 101 includes an arrival adjustment unit 160 as a software processing unit that performs processing unique to the present embodiment.

The arrival adjustment unit 160 includes a determination unit 161, a calculation unit 162, and an adjustment unit 163.

The determination unit 161 determines whether the host vehicle reaches within the next frame when traveling on the remaining section of the section route extending from the current position of the host vehicle on the section route to the next frame. Further, when determining that the host vehicle cannot reach within the next frame with the travel on the remaining section, the determination unit 161 determines whether the host vehicle can reach the next frame on the extension of the remaining section on condition that the host vehicle is caused to travel further from a travel end position of the remaining section with the steering angle and travel direction at the travel end position of the remaining section kept. In addition, the determination unit 161 determines whether the host vehicle does not reach within the next frame even with the travel to the end of the remaining section but can reach within the next frame on the way to the end of the remaining section (that is, whether the next frame is located on the remaining section).

When the determination unit 161 determines that the host vehicle can reach within the next frame on the extension of the remaining section or determines that the next frame is located on the remaining section, the calculation unit 162 calculates an adjustment distance to the next frame.

The adjustment unit 163 generates, based on the calculation result from the calculation unit 162, a parking route including an adjustment route that results from adjusting the travel distance by the adjustment distance, and information on steering control and vehicle speed scheduled at each position on the parking route and passes the parking route and the information to the route generation unit 135 and the vehicle control unit 150, thereby enabling the vehicle control based on the calculation result from the calculation unit 162.

Figure 2:
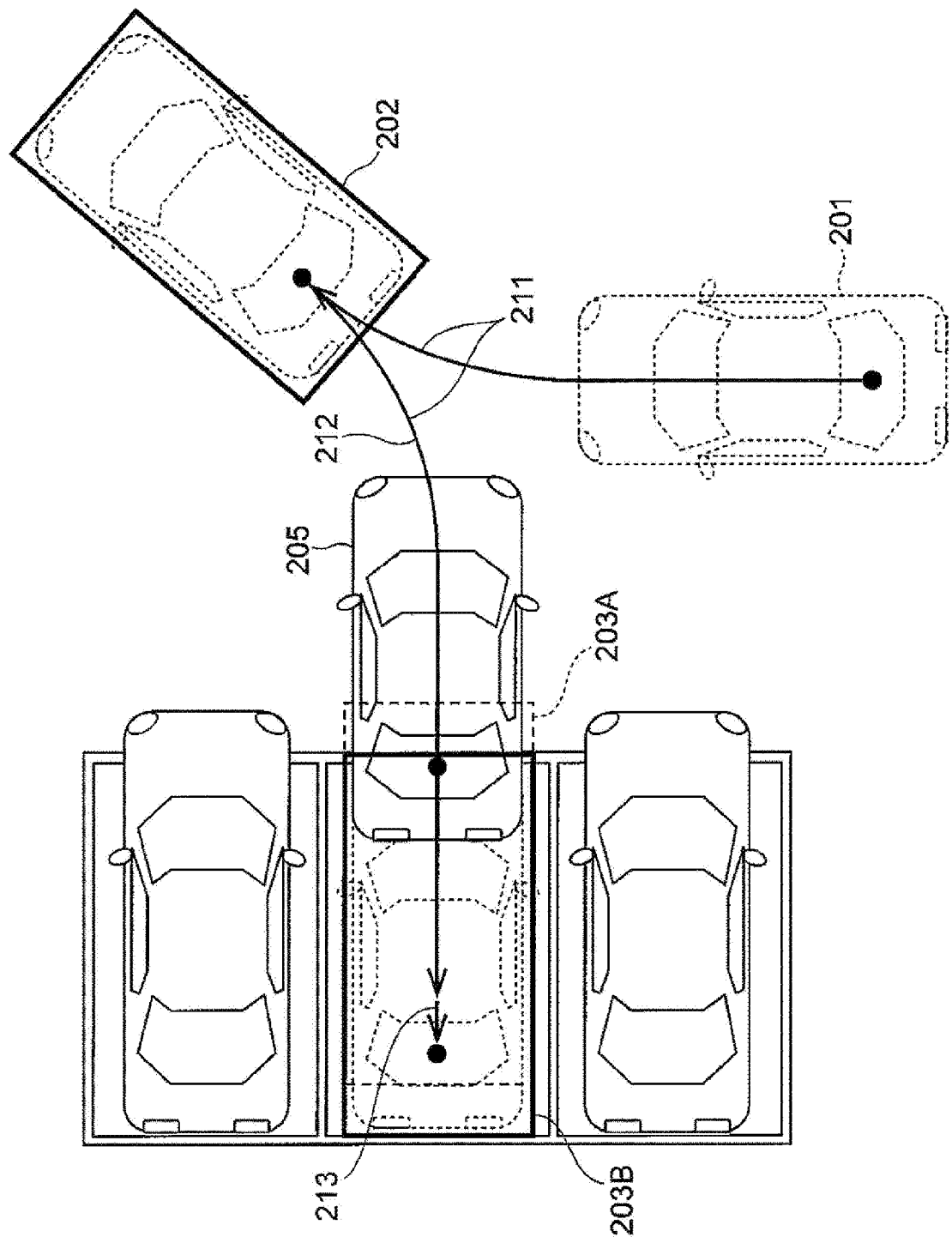
FIG. 2 is a diagram for describing motion of a vehicle equipped with the automatic parking control device when the next frame is located on an extension of the current section route according to the first embodiment of the present invention.

FIG. 2 is a diagram for describing motion of the vehicle equipped with the automatic parking control device 100 when the next frame is located on the extension of the current section route according to the first embodiment of the present invention.

FIG. 2 illustrates motion of the host vehicle equipped with the automatic parking control device 100 when a current position 205 of the host vehicle moves to a position allowing the external environment recognition sensor 172 to visually recognize the back of the parking slot and then the target parking position is changed from an initial target parking position 203A (a dotted-line frame in FIG. 2) to a more appropriate target parking position 203B (a thick-line frame in FIG. 2) that is located backward compared to the initial target parking position 203A.

At this time, when the current position of the host vehicle on a parking route 211 is located on a section route 212 having the target parking position 203A before the change serving as the next frame and on a straight segment or a curved segment immediately before the next frame out of at least one straight segment or curved segment forming the section route 212, the automatic parking control device 100 causes the determination unit 161 and the calculation unit 162 to make the above-described determination and calculation, respectively.

When the determination made by the determination unit 161 shows that the host vehicle can reach within the next frame on condition that the host vehicle is caused to travel further from the travel end position of the remaining section of the section route 212 with a steering angle and travel direction at the travel end position of the remaining section kept, the calculation unit 162 calculates the adjustment distance from the travel end position (end point) of the section route 212 to the next frame, and the adjustment unit 163 adds, to a position ahead of the travel end position of the remaining section of the section route 212 (that is, on the extension of the remaining section of the section route 212), an adjustment route 213 on which the host vehicle is caused to travel further by adding the adjustment distance with the steering angle and travel direction at the travel end position of the remaining section kept. Even when the target parking position moves onto the extension of the section route 212 due to the adjustment route 213, smooth parking control can be made.

Note that the adjustment route may be generated as follows.

Figure 3:
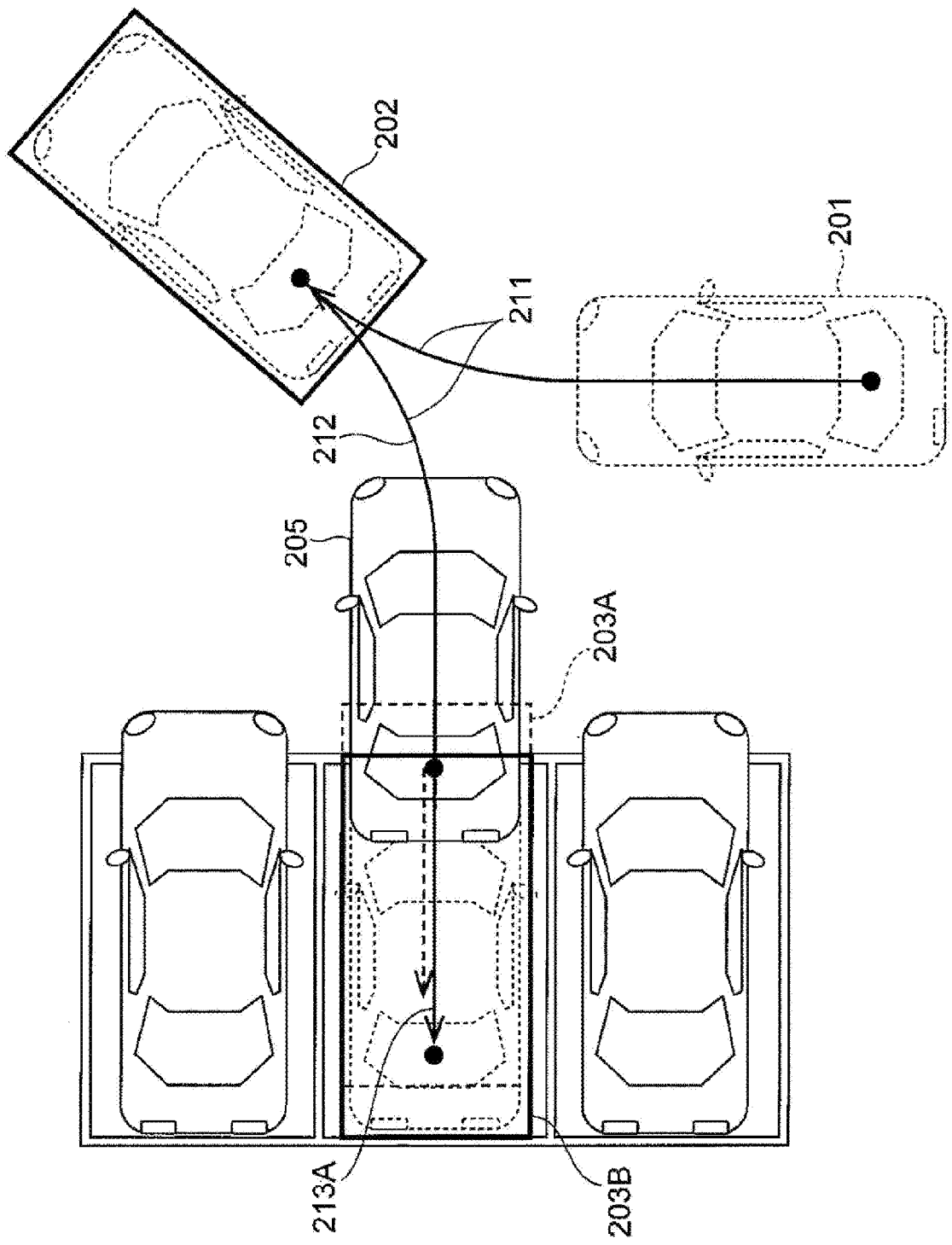
FIG. 3 is a diagram for describing another example of the motion of the vehicle equipped with the automatic parking control device when the next frame is located on the extension of the current section route according to the first embodiment of the present invention.

That is, as illustrated in FIG. 3, when the determination made by the determination unit 161 shows that the host vehicle can reach within the next frame on condition that the host vehicle is caused to travel further from the travel end position of the remaining section of the section route 212 with the steering angle and travel direction at the travel end position of the remaining section kept, the calculation unit 162 calculates the adjustment distance from the current position 205 on the section route 212 to the next frame, and the adjustment unit 163 generates an adjustment route 213A on which the host vehicle is caused to travel from the current position 205 on the section route 212 by the adjustment distance with the steering angle and travel direction at the travel end position of the remaining section kept. Even when the target parking position moves onto the extension of the section route 212 due to the adjustment route 213A, smooth parking control can be made.

Note that, as described above, the parking route 211 is calculated as a chain of at least one section route extending from a parking start position (vehicle control start position) 201 or a turning position 202 to the next frame, and one section route is generally formed of a chain of at least one curved segment or straight segment represented by a specific mathematical expression. The types of the curved segment include an arc that is a path taken when the vehicle travels at a constant steering angle other than 0, a clothoid curve that is a path taken when the vehicle travels at a constant speed while linearly increasing or decreasing the steering angle.

Figure 4:
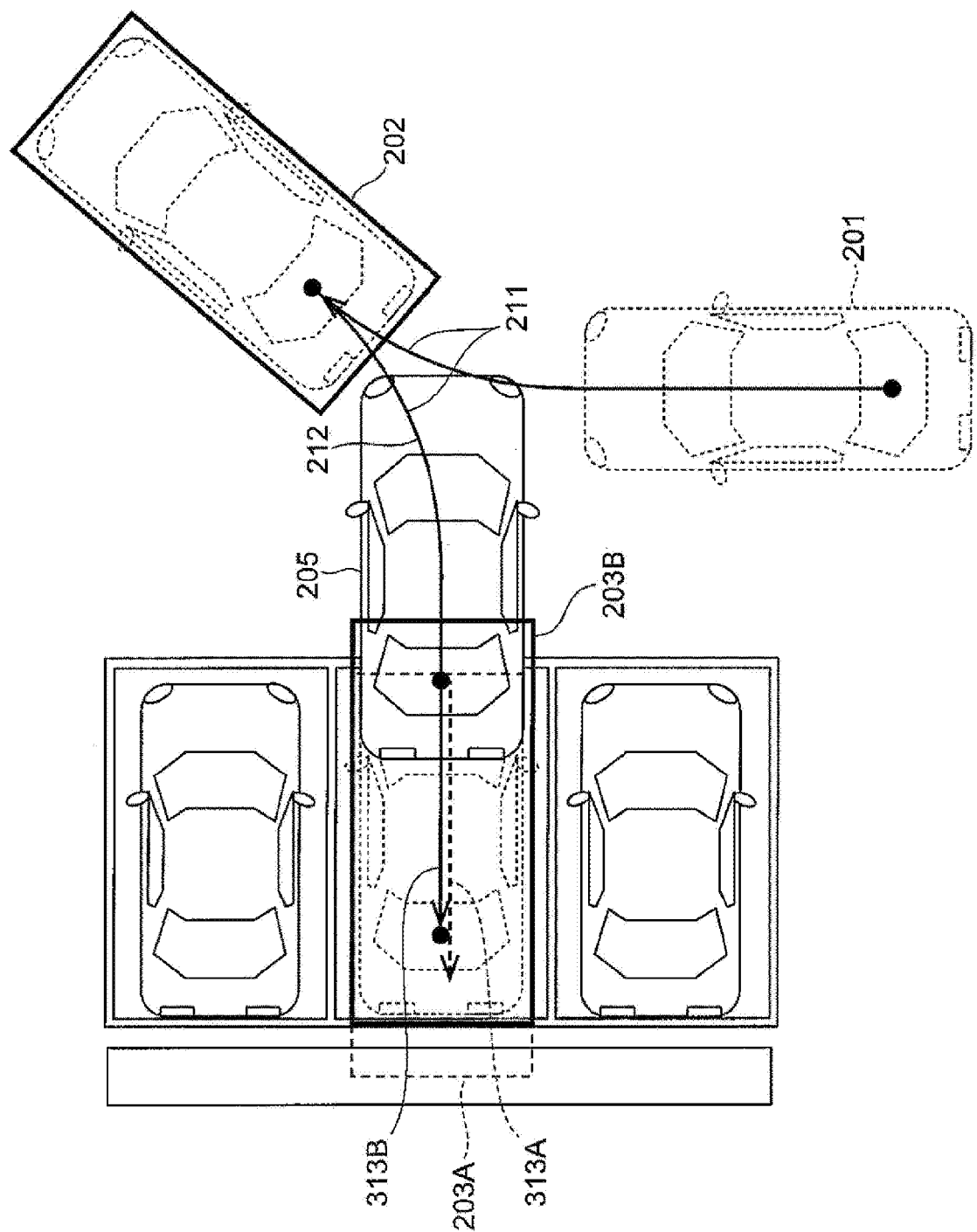
FIG. 4 is a diagram for describing motion of the vehicle equipped with the automatic parking control device when the next frame is located on a remaining section of the current section route according to the first embodiment of the present invention.

FIG. 4 is a diagram for describing motion of the vehicle equipped with the automatic parking control device 100 when the next frame is located on the remaining section of the current section route according to the first embodiment of the present invention.

FIG. 4 illustrates motion of the host vehicle equipped with the automatic parking control device 100 when the current position 205 of the host vehicle moves to a position allowing the external environment recognition sensor 172 to visually recognize the back of the parking slot and then the target parking position is changed from the initial target parking position 203A (a dotted-line frame in FIG. 4) to the more appropriate target parking position 203B (a thick-line frame in FIG. 4) that is located on the near side compared to the initial target parking position 203A.

At this time, when the current position of the host vehicle on a parking route 211 is located on a section route 212 having the target parking position 203A before the change serving as the next frame and on a straight segment or a curved segment immediately before the next frame out of at least one straight segment or curved segment forming the section route 212, the automatic parking control device 100 causes the determination unit 161 and the calculation unit 162 to make the above-described determination and calculation, respectively.

When the determination made by the determination unit 161 shows that the host vehicle does not reach within the next frame even after travel to the end of the remaining section of the section route 212, but the next frame is located on the way to the end of the remaining section, the calculation unit 162 calculates the adjustment distance from the current position 205 on the section route 212 to the next frame, and the adjustment unit 163 replaces a route 313A of the remaining section with an adjustment route 313B on which the vehicle is caused to travel from the current position 205 on the section route 212 by the adjustment distance with a start point and passing positions unchanged. Even when the target parking position moves to a position located before the next frame of the section route 212 due to the adjustment route 313B, smooth parking control can be made.

Note that the adjustment route may be generated as follows.

Figure 5:
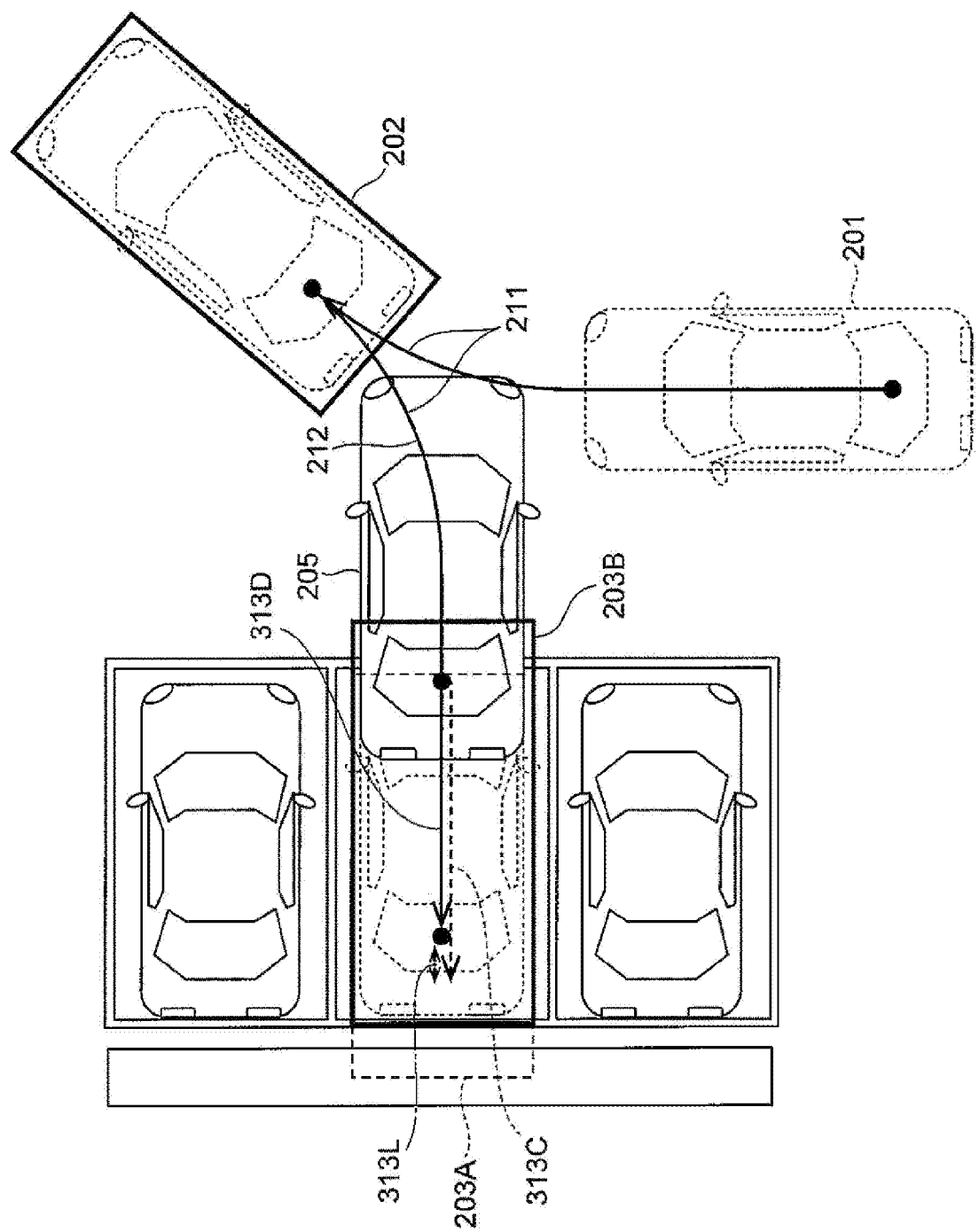
FIG. 5 is a diagram for describing another example of the motion of the vehicle equipped with the automatic parking control device when the next frame is located on the remaining section of the current section route according to the first embodiment of the present invention.

That is, as illustrated in FIG. 5, when the determination made by the determination unit 161 shows that the host vehicle does not reach within the next frame even after travel to the end of the remaining section of the section route 212, but the next frame is located on the way to the end of the remaining section, the calculation unit 162 calculates an adjustment distance 313L from the travel end position (end point) of the section route 212 to the next frame, and the adjustment unit 163 replaces a route 313C of the remaining section with an adjustment route 313D that results from shortening the remaining section of the section route 212 by the adjustment distance 313L with a start point and passing positions unchanged. Even when the target parking position moves to a position located before the next frame of the section route 212 due to the adjustment route 313D, smooth parking control can be made.

Figure 6:
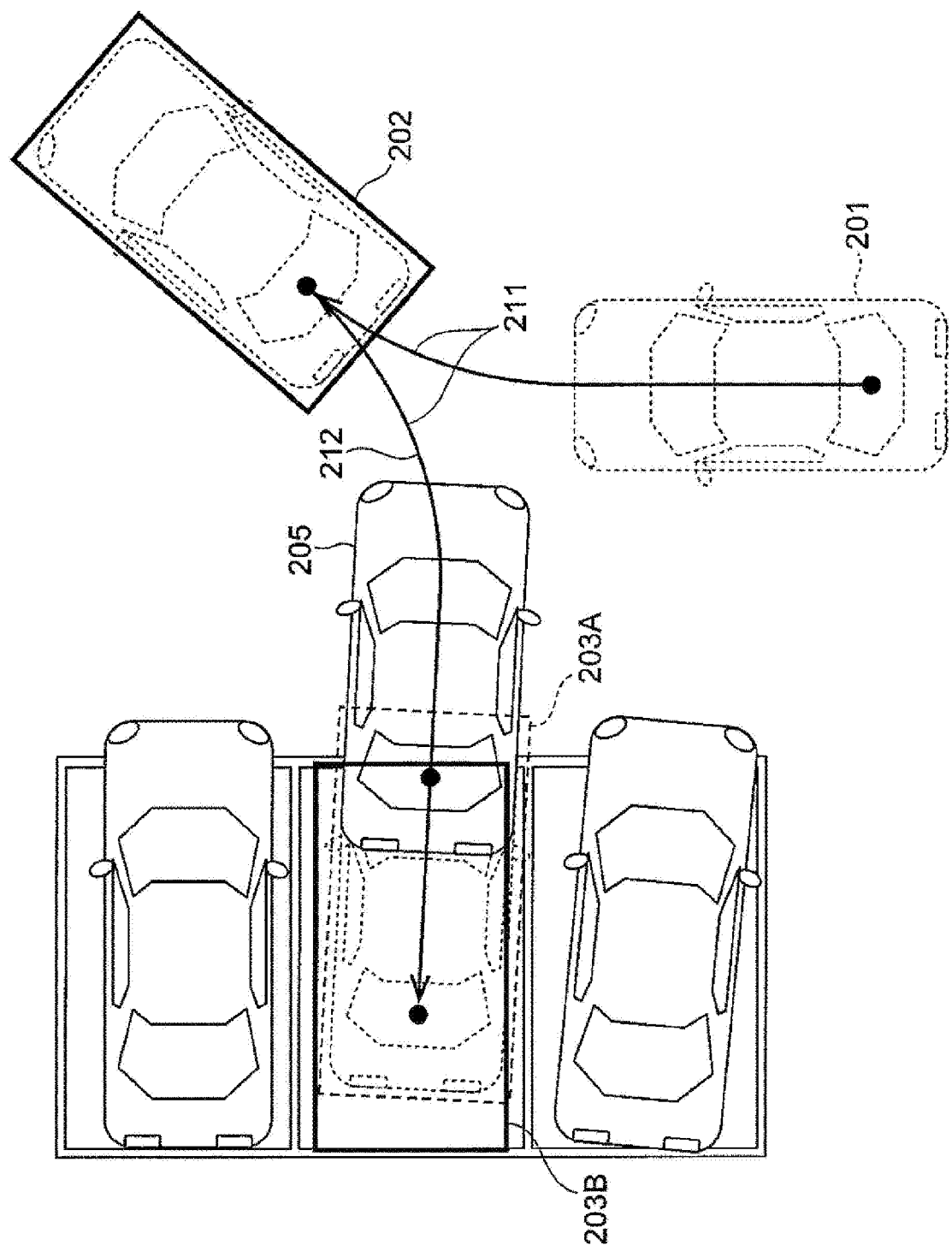
FIG. 6 is a diagram for describing motion of the vehicle equipped with the automatic parking control device when the next frame is located on neither the extension nor the remaining section of the current section route according to the first embodiment of the present invention.

FIG. 6 is a diagram for describing motion of the vehicle equipped with the automatic parking control device 100 when the next frame is located on neither the extension nor the remaining section of the current section route according to the first embodiment of the present invention.

FIG. 6 illustrates motion of the host vehicle equipped with the automatic parking control device 100 when the current position 205 of the host vehicle moves to a position allowing the external environment recognition sensor 172 to visually recognize the back of the parking slot and then the target parking position is changed from the initial target parking position 203A (a dotted-line frame in FIG. 6) to the more appropriate target parking position 203B (a thick-line frame in FIG. 6) that is located on neither the extension nor the remaining section of the section route 212.

At this time, when the current position of the host vehicle on a parking route 211 is located on a section route 212 having the target parking position 203A before the change serving as the next frame and on a straight segment or a curved segment immediately before the next frame out of at least one straight segment or curved segment forming the section route 212, the automatic parking control device 100 causes the determination unit 161 and the calculation unit 162 to make the above-described determination and calculation, respectively.

When the determination made by the determination unit 161 shows that the next frame is located on neither the extension nor the remaining section of the section route 212, an attempt to cause the arrival adjustment unit 160 to adjust the section route 212 so as to allow the host vehicle to reach the next frame is abandoned, the host vehicle is controlled to travel on the initial section route 212 and come to a stop at the initial target parking position 203A (next frame) (in other words, the travel end position of the remaining section of the section route 212), and then the route generation unit 135 regenerates the parking route 211. Alternatively, the parking route 211 may be regenerated after the host vehicle is caused to immediately come to a stop on the section route 212 (in other words, from a position where the vehicle comes to a stop after traveling from the current position 205 on the section route 212).

Figure 7:
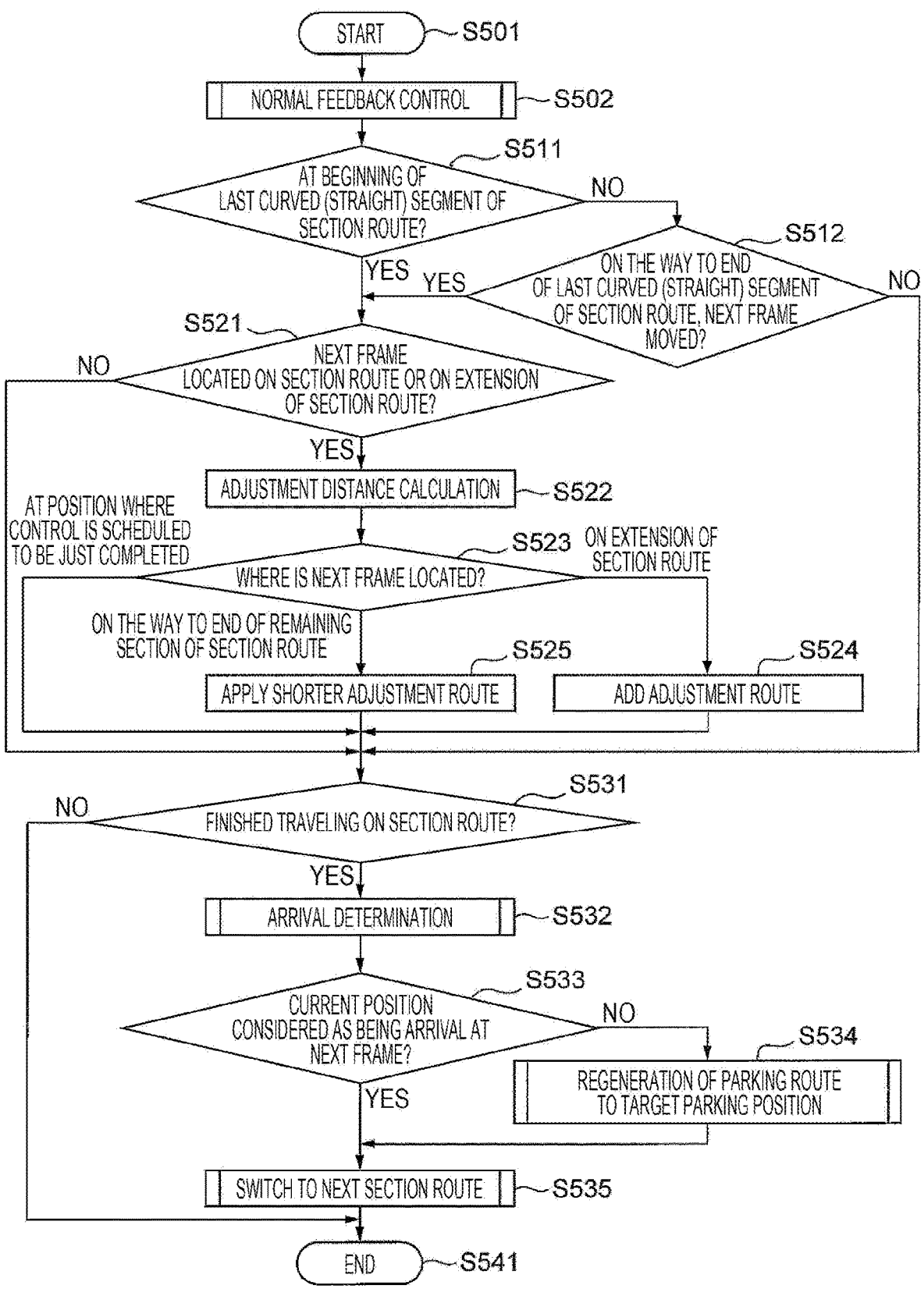
FIG. 7 is a flowchart showing one cycle of cyclic processing in the automatic parking control device when a host vehicle is caused to travel on the current section route under vehicle control according to the first embodiment of the present invention.

FIG. 7 is a flowchart showing one cycle of cyclic processing in the automatic parking control device 100 when the host vehicle is caused to travel on the current section route under vehicle control according to the first embodiment of the present invention.

In the flowchart shown in FIG. 7, steps S511 to 525 correspond to processing unique to the present embodiment.

Note that the flowchart shown in FIG. 7 represents only the processing required to cause the host vehicle to travel on the current section route, and no description will be given of the other processing (space recognition processing, display processing, processing related to obstacle detection, and the like).

Upon the start of the cyclic processing (step S501), first, vehicle control under which the host vehicle is caused to travel on the current section route is performed under normal feedback control (step S502). More specifically, the current position and orientation of the host vehicle based on the host vehicle position estimation made by the host vehicle position estimation unit 145 are compared with supposed position and orientation of the host vehicle on the section route based on the current travel distance, and then, the feedback control is performed to bring the current position and orientation of the host vehicle closer to the supposed position and orientation on the section route. When the arrival adjustment according to the present embodiment has been already performed, the section route adjusted by the arrival adjustment processing is used for the feedback control. This feedback control is performed by the vehicle control unit 150.

Next, in order to determine whether it is a timing to apply the processing of the determination unit 161, the processing of the calculation unit 162, and the processing of the adjustment unit 163 according to the present embodiment, a determination is made whether the host vehicle position is located at the beginning of the last curved segment or straight segment of the section route (that is, immediately before the next frame) (step S511), and then a determination is made whether the host vehicle position is located on the way to the end of the last curved segment or straight segment of the section route and the position of the next frame has moved (changed) (step S512). When either step S511 or step S512 is determined to be YES, the processing proceeds to step S521. When both step S511 and step S512 are determined to be NO, the processing proceeds to step S531. This determination is made by, for example, the determination unit 161.

Note that the determination in step S511 takes into consideration a case where the feedback control fails to make a complete correction due to accumulation of errors, external factors, or the like.

In step S521, a determination is made whether the next frame is located on the remaining section (consisting of only one curved segment or straight segment that can be represented by a specific mathematical expression) of the section route or the extension of the remaining section. When the next frame has moved, the determination is made on the next frame that has been moved. When it is possible to reach within the next frame on the way to the end of the remaining section or on the extension of the remaining section, the processing proceeds to step S522. When no next frame is located on the way to the end the remaining section or on the extension of the remaining section, the processing directly proceeds to step S531. This determination is made by, for example, the determination unit 161.

In step S522, the adjustment distance to the next frame is calculated. This calculation is made by the calculation unit 162.

Next, based on the determination result in step S521 and the calculation result in step S522, a determination is made whether the processing of the adjustment unit 163 is applied, and, when the processing is applied, a determination is made what kind of processing is applied (step S523). When the determination in step S521 shows that the next frame is located at a position where control on the remaining section of the section route has just been completed, the processing directly proceeds to step S531. When a determination is made that the next frame is located on the extension of the remaining section, processing of adding the adjustment route (adjustment route that results from adjusting the travel distance by the adjustment distance calculated in step S522) to the end of the section route is performed (step S524). When a determination is made that the next frame is located on the way to the end of the remaining section, processing of replacing the section route with the adjustment route that results from shortening the remaining section of the section route (adjustment route that results from adjusting the travel distance by the adjustment distance calculated in step S522) is performed (step S525). Steps S524 and S525 are performed by the adjustment unit 163.

When step S524 or step S525 is completed, the processing proceeds to step S531.

In step S531, a determination is made whether vehicle control under which the host vehicle is caused to travel on the current section route is completed. When the arrival adjustment according to the present embodiment has been already performed, the section route adjusted by the arrival adjustment processing is used for the determination. When the determination result in step S531 shows that the vehicle control is completed, the processing proceeds to step S532. When the vehicle control is not completed, the processing proceeds to step S541. This determination is made by, for example, the vehicle control unit 150.

In step S532, the position and orientation of the next frame are compared with the current position and orientation of the host vehicle based on the host vehicle position estimation, and a determination is made whether the host vehicle is considered to have reached the next frame. This determination is made by the arrival determination unit 140.

Next, when the determination result in step S532 shows that the host vehicle is considered to have reached the next frame, the processing proceeds to step S535 (step S533). When the host vehicle is not considered to have reached the next frame, it is considered that the result of the vehicle control on the host vehicle deviates from the next frame, and accordingly the processing proceeds to step S534 (step S533) in which the parking route extending from the current host vehicle position to the target parking position is regenerated and then proceeds to step S535. The regeneration of the parking route in step S534 is made by the route generation unit 135.

In step S535, the section route is switched to the next section route. At this time, when the parking route has been regenerated just before in step S534, the section route is switched to the first section route of the parking route thus regenerated. When the host vehicle reaches the target parking position, there is no next section route left, so that the vehicle control under which the host vehicle is caused to travel on the parking route is brought to an end.

In step S541, this processing cycle is brought to an end.

Figure 8:
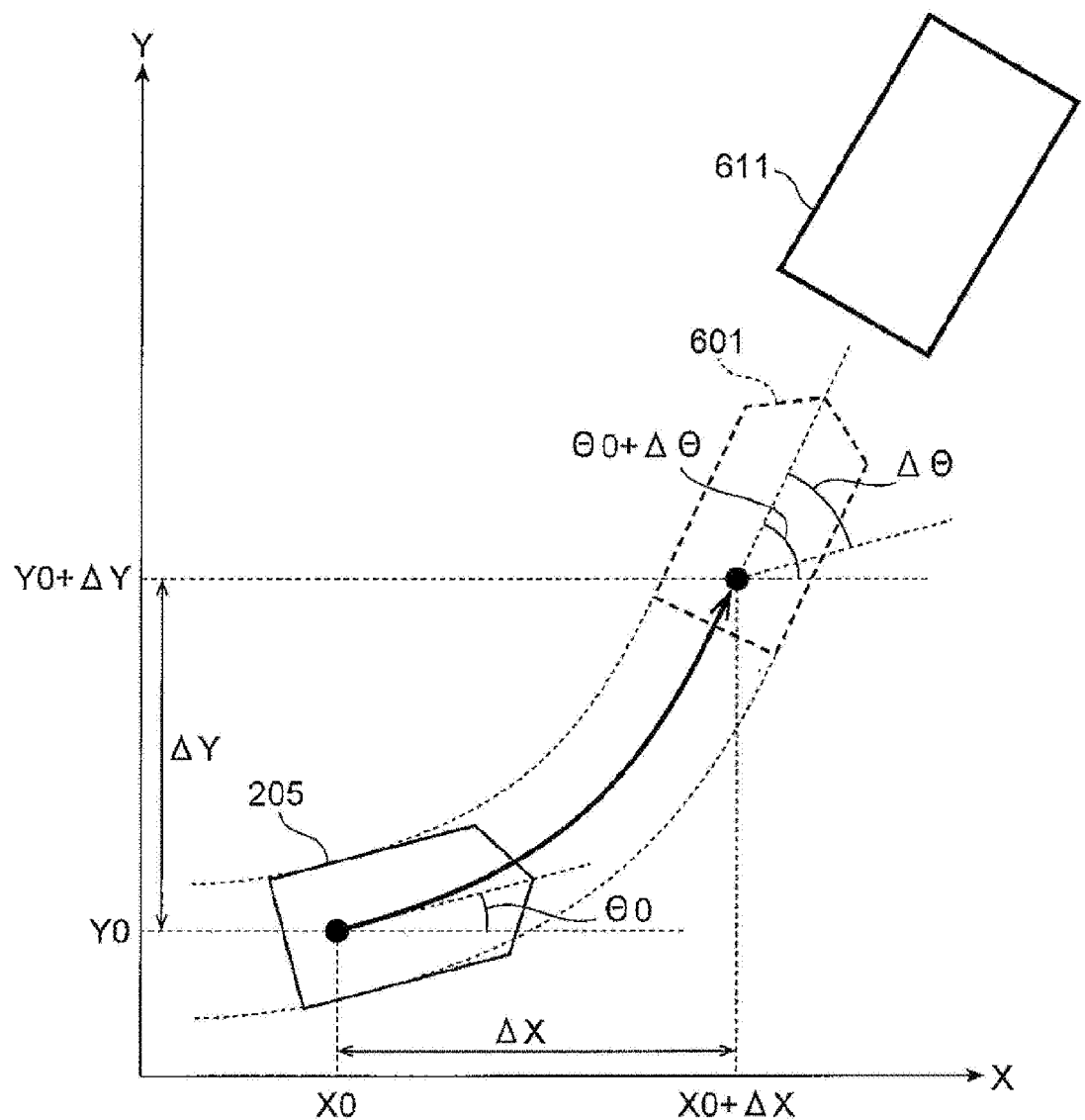
FIG. 8 is a diagram for describing a method of determining, from the current position of the host vehicle and the remaining section of the section route, a host vehicle position when the host vehicle has finished traveling on the remaining section according to the first embodiment of the present invention.

FIG. 8 is a diagram for describing a method of determining, from the current position of the host vehicle and the remaining section of the section route, the host vehicle position when the host vehicle has finished traveling on the remaining section according to the first embodiment of the present invention.

In order for the determination unit 161 according to the present embodiment to determine whether the host vehicle reaches within the next frame when traveling on the remaining section of the section route to the next frame and determine whether the host vehicle can reach within the next frame when further traveling from the travel end position of the remaining section with the steering angle and travel direction at the travel end position of the remaining section kept, it is required that the host vehicle position when the host vehicle has finished traveling on the remaining section from the current position of the host vehicle be determined beforehand.

Note that, in the following description, a center of a rear wheel axle of the vehicle is taken as the host vehicle position. This is because, when the vehicle travels at low speed as in automatic parking, it can be roughly considered that neither centrifugal force nor a wheel skid occurs, which makes it possible to apply Ackermann steering geometry to vehicle motion analysis and thus to consider a turning center of the vehicle as being located on the extension of the rear wheel axle.

The current position 205 based on the host vehicle position estimation on space coordinates (ground-fixed coordinates) is denoted as (X0, Y0, Θ0). Herein, X0 denotes an X coordinate, Y0 denotes a Y coordinate, and Θ0 denotes a yaw angle. Further, a shift in coordinate from the supposed position of the host vehicle on the section route based on the current travel distance and to the current position when the host vehicle has finished traveling on the remaining section of the section route is denoted as (ΔX, ΔY, ΔΘ). A method of calculating ΔX, ΔY, ΔΘ depends on a method of generating the parking route.

At this time, a host vehicle position 601 when the host vehicle has finished traveling on the remaining section from the current position of the host vehicle can be denoted as (X0+ΔX, Y0+ΔY, Θ0+ΔΘ).

From the above, the host vehicle position when the host vehicle has finished traveling on the remaining section from the current position of the host vehicle is determined, but it is convenient in terms of calculation to make conversion to a vehicle-fixed coordinate system for a determination of whether the current host vehicle position is located within the next frame and a determination of whether the host vehicle can reach within the next frame when further traveling from the current host vehicle position. Therefore, coordinates of a next frame 611 are converted to coordinates in the vehicle-fixed coordinate system in which the center of the rear wheel axle at the host vehicle position 601 when the host vehicle has finished traveling on the remaining section is defined as an origin and yaw angle 0.

Figure 9:
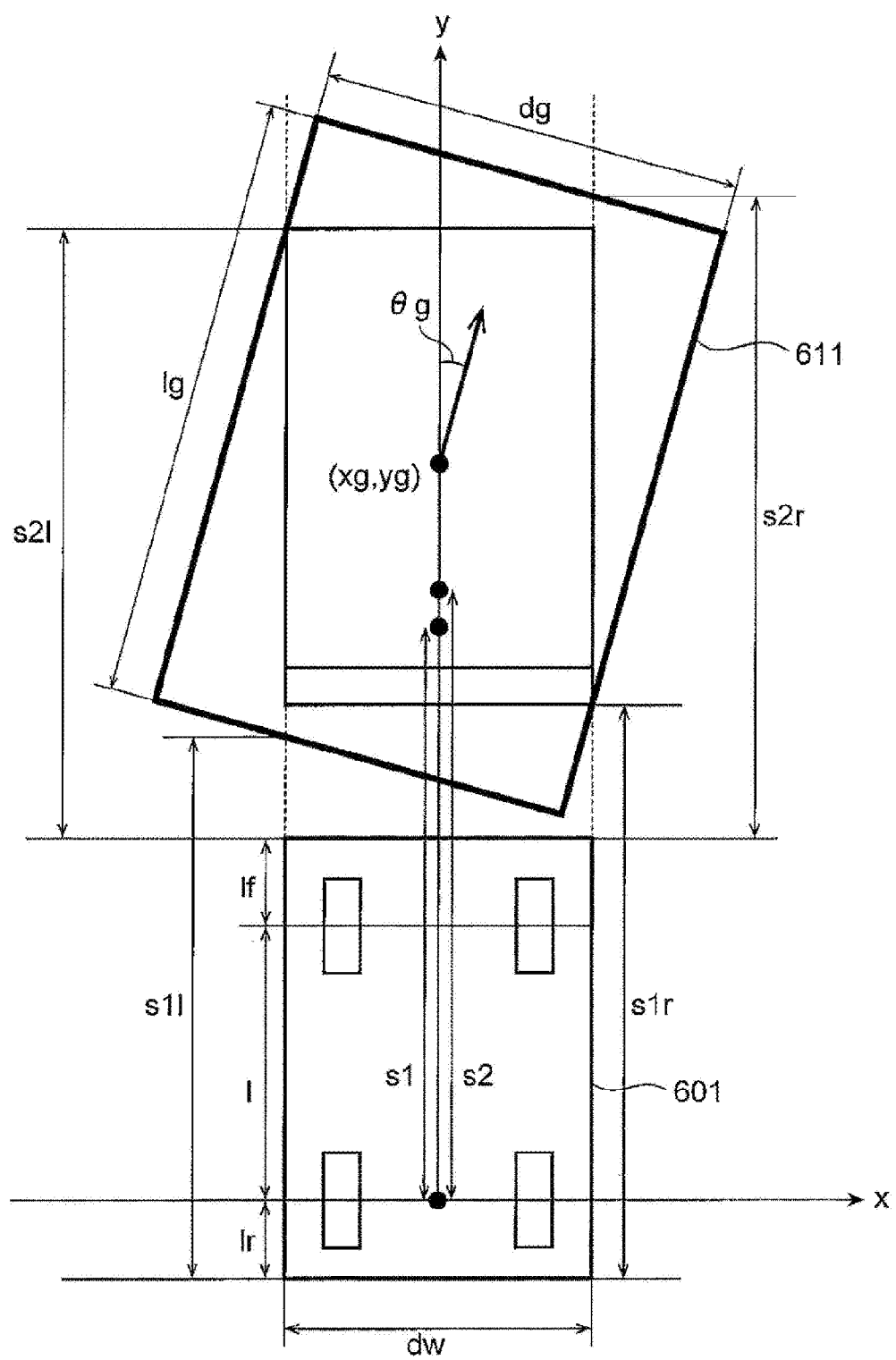
FIG. 9 is a diagram for describing a method of determining whether the next frame is located on the extension of the current section route when a steering angle is 0 at an end position of the current section route according to the first embodiment of the present invention.

FIG. 9 is a diagram for describing a method of determining whether the next frame is located on the extension of the current section route when the steering angle is 0 at the end position of the current section route according to the first embodiment of the present invention.

The diagram of FIG. 9 shows that the coordinates of the next frame 611 are converted to coordinates in the vehicle-fixed coordinate system in which the center of the rear wheel axle at the host vehicle position 601 when the host vehicle has finished traveling on the remaining section is defined as the origin and yaw angle 0.

Herein, the coordinates of the next frame 611 after the conversion are denoted as a center (xg, yg), a width dg, a depth lg, and a yaw angle θg. Further, in order to simplify calculation, the vehicle is considered to have a rectangular shape, a wheelbase of the vehicle (a length from the front axle to the rear axle), a front length (a length from the front end to the front axle of the vehicle), a rear length (a length from the rear end to the rear axle of vehicle), and a width are denoted as l, lf, lr, and dw, respectively.

Further, "vehicle has reached the next frame" refers to a situation where all the four corners of the vehicle are within the next frame, and the yaw angle of the vehicle lies within an allowable range (θg±α) of the yaw angle for the next frame.

At this time, when the vehicle travels forward (or backward) with the actual steering angle 0 kept from the host vehicle position 601 when the vehicle has finished traveling on the remaining section, the vehicle travels straight along the y axis with the center of the rear axle placed on the y axis.

An area of the next frame 611 is an area that satisfies all the following four inequalities shown in Expression 1.

$$y - yg + \frac{lg}{2}\cos\theta g \geq -\left(x - xg + \frac{lg}{2}\sin\theta g\right)\tan\theta g \quad \text{[Expression 1]}$$

$$y - yg - \frac{lg}{2}\cos\theta g \leq -\left(x - xg - \frac{lg}{2}\sin\theta g\right)\tan\theta g$$

$$\left(y - yg - \frac{dg}{2}\sin\theta g\right)\tan\theta g \leq x - xg + \frac{dg}{2}\cos\theta g$$

$$\left(y - yg + \frac{dg}{2}\sin\theta g\right)\tan\theta g \geq x - xg - \frac{dg}{2}\cos\theta g$$

Herein, $0 \leq \theta g < \pi/2$ is satisfied. Even with $-\pi/2 < \theta g < 0$ satisfied, a solution can be found in the same manner. Note that $\alpha \geq \pi/2$ allows a case where the host vehicle orients in a direction different by 90° from the next frame or in a direction opposite to the next frame, which is not practically conceivable.

With respective travel distances from a left rear end point, a right rear end point, a left front end point, and a right front end point of the vehicle to straight lines of a rear side, a right side, a left side, and a front side of the next frame denoted as s1l, s1r, s2l, and s2r, a range of the travel distance s1 to s2 (a range of from s1 to s2, both inclusive, which is hereinafter used in the same meaning) in which all the four corners of the vehicle are within the next frame 611 is represented by the following Expression 2.

$$s1l = \left(\frac{dw}{2} + xg\right)\tan\theta g - \frac{lg}{2}\left(\frac{1}{\tan\theta g} + \tan\theta g\right)\sin\theta g + lr + yg \quad \text{[Expression 2]}$$

$$s1r = \left(\frac{dw}{2} - xg\right)\frac{1}{\tan\theta g} - \frac{dg}{2}\left(\frac{1}{\tan\theta g} + \tan\theta g\right)\cos\theta g + lr + yg$$

$$s2l = -\left(\frac{dw}{2} + xg\right)\frac{1}{\tan\theta g} + \frac{dg}{2}\left(\frac{1}{\tan\theta g} + \tan\theta g\right)\cos\theta g - l - lf + yg$$

$$s2r = -\left(\frac{dw}{2} - xg\right)\tan\theta g + \frac{lg}{2}\left(\frac{1}{\tan\theta g} + \tan\theta g\right)\sin\theta g - l - lf + yg$$

$$s1 = \max(s1l, s1r)$$

$$s2 = \min(s2l, s2r)$$

Note that, in the above calculation, the travel distance represents a positive number in the forward direction and a negative number in the reverse direction.

According to the above calculation, when $s1 \leq 0 \leq s2$ and $-\alpha \leq \theta g \leq \alpha$ are satisfied at the host vehicle position 601 when the host vehicle has finished traveling on the remaining section, the host vehicle will reach the next frame 611.

Further, when $0 < s1 \leq s2$ and $-\alpha \leq \theta g \leq \alpha$ are satisfied, the next frame 611 is located ahead of the host vehicle position 601 when the host vehicle has finished traveling on the remaining section, and the host vehicle can reach the next frame 611 by traveling forward by a distance of from s1 to s2. When $s1 \leq s2 < 0$ is satisfied, the next frame 611 is located behind the host vehicle position 601 when the host vehicle has finished traveling on the remaining section, and the host vehicle can reach the next frame 611 by traveling backward by a distance of from |s2| to |s1|. When the travel direction at the host vehicle position 601 when the host vehicle has finished traveling on the remaining section coincides with the travel direction for reaching the next frame 611, the next frame 611 can be considered as being located on the extension of the current section route.

Figure 10:
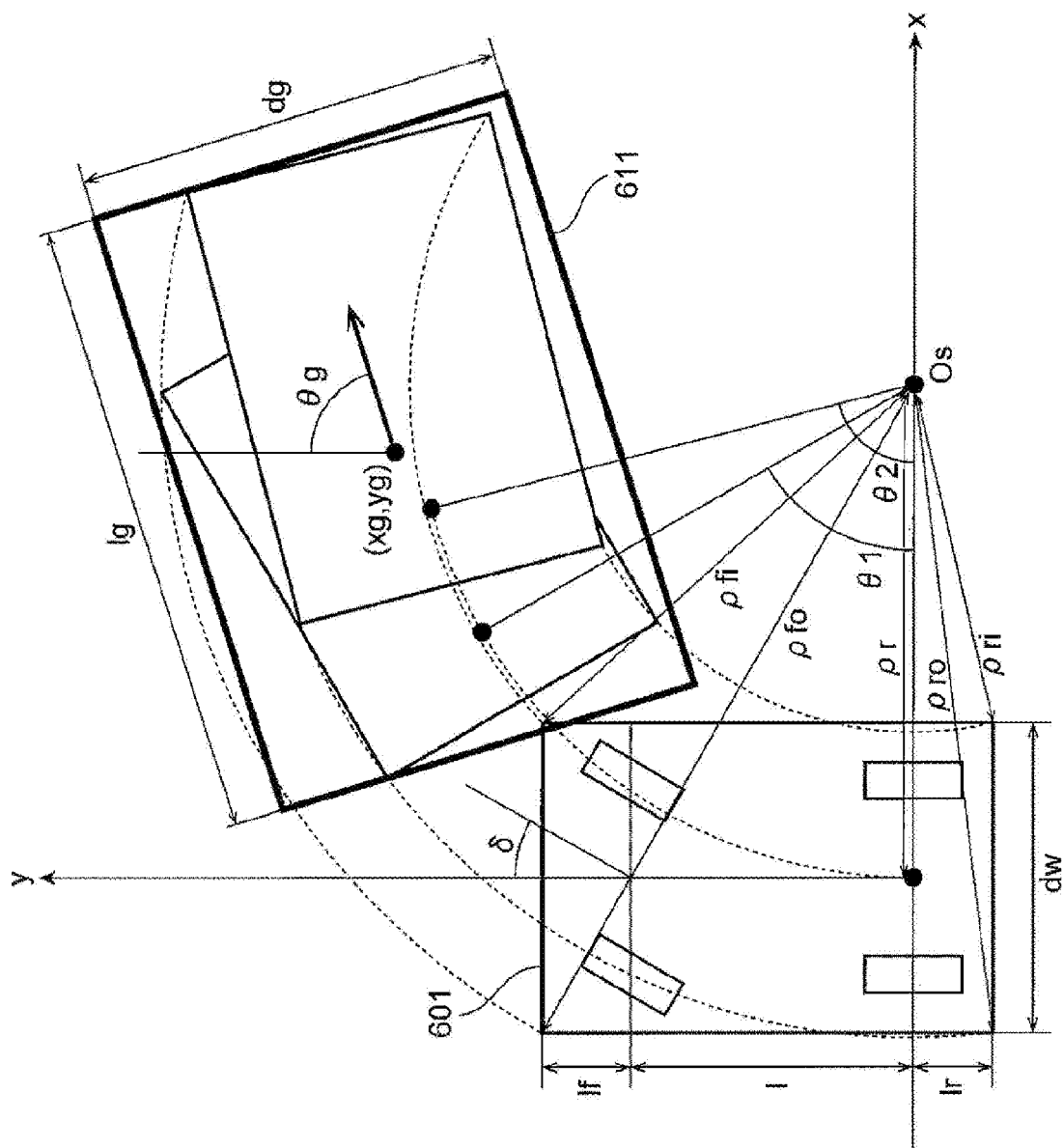
FIG. 10 is a diagram for describing the method of determining whether the next frame is located on the extension of the current section route when the steering angle is not 0 at the end position of the current section route according to the first embodiment of the present invention.

FIG. 10 is a diagram for describing a method of determining whether the next frame is located on the extension of the current section route when the steering angle is not 0 at the end position of the current section route according to the first embodiment of the present invention.

The diagram of FIG. 10 shows that the coordinates of the next frame 611 are converted to coordinates in the vehicle-fixed coordinate system in which the center of the rear wheel axle at the host vehicle position 601 when the host vehicle has finished traveling on the remaining section is defined as the origin and yaw angle 0.

Herein, the coordinates of the next frame 611 after the conversion and the dimensions of the vehicle are set the same as the coordinates and dimensions in FIG. 9, and the actual steering angle when the host vehicle has finished traveling on the remaining section is denoted as $\delta (\neq 0)$.

When the host vehicle travels forward (or backward) with the actual steering angle $\delta$ kept from the host vehicle position 601 when the host vehicle has finished traveling on the remaining section, the host vehicle turns right when $\delta > 0$, and turns left when $\delta < 0$. In order to simplify the following description, the right turn ($0 < \delta < \pi/2$) is applied herein. The left turn can be considered as being symmetrical.

Herein, in order to apply Ackermann steering geometry, the turning center is located on the x-axis of the vehicle-fixed coordinate system. The position of the turning center is denoted as Os, and respective turning radii ρr, ρfo, ρfi, ρro, and ρri of the center of the rear wheel axle, a front-outside vehicle end point, a front-inside vehicle end point, a rear-outside vehicle end point, and a rear-inside vehicle end point of the host vehicle, and respective turning-angle deviations θr, θfo, θfi, θro, and θri of the center of the rear wheel axle, the front-outside vehicle end point, the front-inside vehicle end point, the rear-outside vehicle end point, and the rear-inside vehicle end point of the host vehicle from the center of the rear wheel axle are determined by the following Expression 3.

$$\rho r = \frac{1}{\tan\delta} \quad \theta r = 0 \quad \text{[Expression 3]}$$

$$\rho fo = \sqrt{\left(\rho r + \frac{dw}{2}\right)^2 + (l + lf)^2} \quad \theta fo = \arctan\left(\frac{l + lf}{\rho r + \frac{dw}{2}}\right)$$

$$\rho fi = \sqrt{\left(\rho r - \frac{dw}{2}\right)^2 + (l + lf)^2} \quad \theta fi = \arctan\left(\frac{l + lf}{\rho r - \frac{dw}{2}}\right)$$

$$\rho ro = \sqrt{\left(\rho r + \frac{dw}{2}\right)^2 + lr^2} \quad \theta ro = -\arctan\left(\frac{lr}{\rho r + \frac{dw}{2}}\right)$$

$$\rho ri = \sqrt{\left(\rho r - \frac{dw}{2}\right)^2 + lr^2} \quad \theta ri = -\arctan\left(\frac{lr}{\rho r - \frac{dw}{2}}\right)$$

In accordance with paths of the four corners of the vehicle based on the turning radii and turning-angle deviations represented by Expression 3 and the area of the next frame 611 represented by the four inequalities of Expression 1, a turning-angle range θ1 to θ2 in which the four corners of the vehicle are within the next frame 611 when the host vehicle travels while turning from the host vehicle position 601 when the host vehicle has finished traveling on the section route and the turning angle lies within the allowable range ($\theta g \pm \alpha$) of the yaw angle for the next frame 611 is determined.

Herein, originally, the minimum value and the maximum value of the turning angles that satisfy all the above conditions will be determined based on the four linear inequalities shown in Expression 1 and four circular functions that define the paths of the four corners, but this requires division into many cases and in turn makes the discussion complicated. Therefore, in order to simplify the description herein, a description will be given only of a case where a turning path of the vehicle and the next frame 611 have a positional relation as shown in FIG. 10.

In the positional relation shown in FIG. 10, first, with consideration given to the turning-angle range θ1c to θ2c based only on the conditions of the four corners of the vehicle, θ1c corresponds to a turning angle of the center of the rear wheel axle when a rear-side straight line of the next frame 611 intersects a circular path of the rear-outside vehicle end point. This intersection point is determined as a solution to simultaneous equations shown in the following Expression 4.

$$(x - \rho ro)^2 + y^2 = \rho ro^2 \qquad \text{[Expression 4]}$$

$$\left(y - yg + \frac{lg\cos\theta g}{2}\right) = -\tan\theta g \cdot \left(x - xg + \frac{lg\sin\theta g}{2}\right)$$

Therefore, coordinates (xro1, yro1) of the rear-outside vehicle end point at the turning angle θ1c are determined by the following Expression 5.

$$xro1 = \frac{\rho ro + Crr\tan\theta g \mp \sqrt{\rho ro^2 + 2\cdot\rho ro\cdot Crr\tan\theta g - Crr^2}}{1 + \tan^2\theta g} \qquad \text{[Expression 5]}$$

$$yro1 = \frac{-\rho ro\tan\theta g + Crr \pm \sqrt{\rho ro^2 + 2\cdot\rho ro\cdot Crr\tan\theta g - Crr^2}\cdot\tan\theta g}{1 + \tan^2\theta g}$$

$$\left(\text{where, } Crr = yg - \frac{lg\cos\theta g}{2} + \left(xg - \frac{lg\sin\theta g}{2}\right)\cdot\tan\theta g\right)$$

The turning angles θ1c and θ1 at this time are determined by the following Expression 6 (where, when θ1c>θg+α is satisfied, there is no solution to θ1).

$$\theta 1c = \arctan\left(\frac{yro1}{xro1}\right) - \theta ro \qquad \text{[Expression 6]}$$

$$\theta 1 = \max(\theta 1c, \theta g - \alpha)$$

Similarly, coordinates (xfo2, yfo2) of the front-outside vehicle end point at the turning angle θ2c are determined by the following Expression 7.

$$xfo2 = \frac{\rho fo + Cfr\tan\theta g \mp \sqrt{\rho fo^2 + 2\cdot\rho fo\cdot Cfr\tan\theta g - Cfr^2}}{1 + \tan^2\theta g} \qquad \text{[Expression 7]}$$

$$yfo2 = \frac{-\rho fo\tan\theta g + Cfr \pm \sqrt{\rho fo^2 + 2\cdot\rho fo\cdot Cfr\tan\theta g - Cfr^2}\cdot\tan\theta g}{1 + \tan^2\theta g}$$

$$\left(\text{where, } Cfr = yg - \frac{lg\cos\theta g}{2} + \left(xg + \frac{lg\sin\theta g}{2}\right)\cdot\tan\theta g\right)$$

The turning angles θ2c and θ2 at this time are determined by the following Expression 8 (where, when θ2c<θg−α is satisfied, there is no solution to θ2).

$$\theta 2c = \arctan\left(\frac{yfo2}{xfo2}\right) - \theta fo \qquad \text{[Expression 8]}$$

$$\theta 2 = \min(\theta 2c, \theta g + \alpha)$$

Note that, in the positional relation as shown in FIG. 10, it is assumed that yfo2>0 is satisfied, and thus the plus-minus sign and the minus-plus sign in the expressions give a positive solution and a negative solution, respectively.

According to the above calculation, when there are solutions to θ1c and θ2c and θ1≤0≤θ2 is satisfied at the host vehicle position 601 when the host vehicle has finished traveling on the remaining section, the host vehicle will reach the next frame 611.

Further, when there are solutions to θ1c and θ2c and 0<θ1≤θ2 is satisfied, the host can reach the next frame 611 by traveling forward by the distance of from s1 to s2 on condition that the next frame 611 is located ahead of the host vehicle position 601 when the host vehicle has finished traveling on the remaining section. When there are solutions to θ1c and θ2c and θ1≤θ2<0 is satisfied, the host can reach the next frame 611 by traveling backward by the distance of from |s2| to |s1| on condition that the next frame 611 is located behind the host vehicle position 601 when the host vehicle has finished traveling on the remaining section. When the travel direction at the host vehicle position 601 when the host vehicle has finished traveling on the remaining section coincides with the travel direction for reaching the next frame 611, the next frame 611 can be considered as being located on the extension of the current section route.

Note that the above s1 and s2 can be determined by the following Expression 9.

$$s1 = \rho r \cdot \theta 1 = l \cdot \frac{\theta 1}{\tan\delta} \qquad \text{[Expression 9]}$$

$$s2 = \rho r \cdot \theta 2 = l \cdot \frac{\theta 2}{\tan\delta}$$

Next, a description will be given of an example of a vehicle control method of maneuvering the host vehicle into the next frame according to the first embodiment of the present invention with reference to FIGS. 11 and 12.

Figure 11:
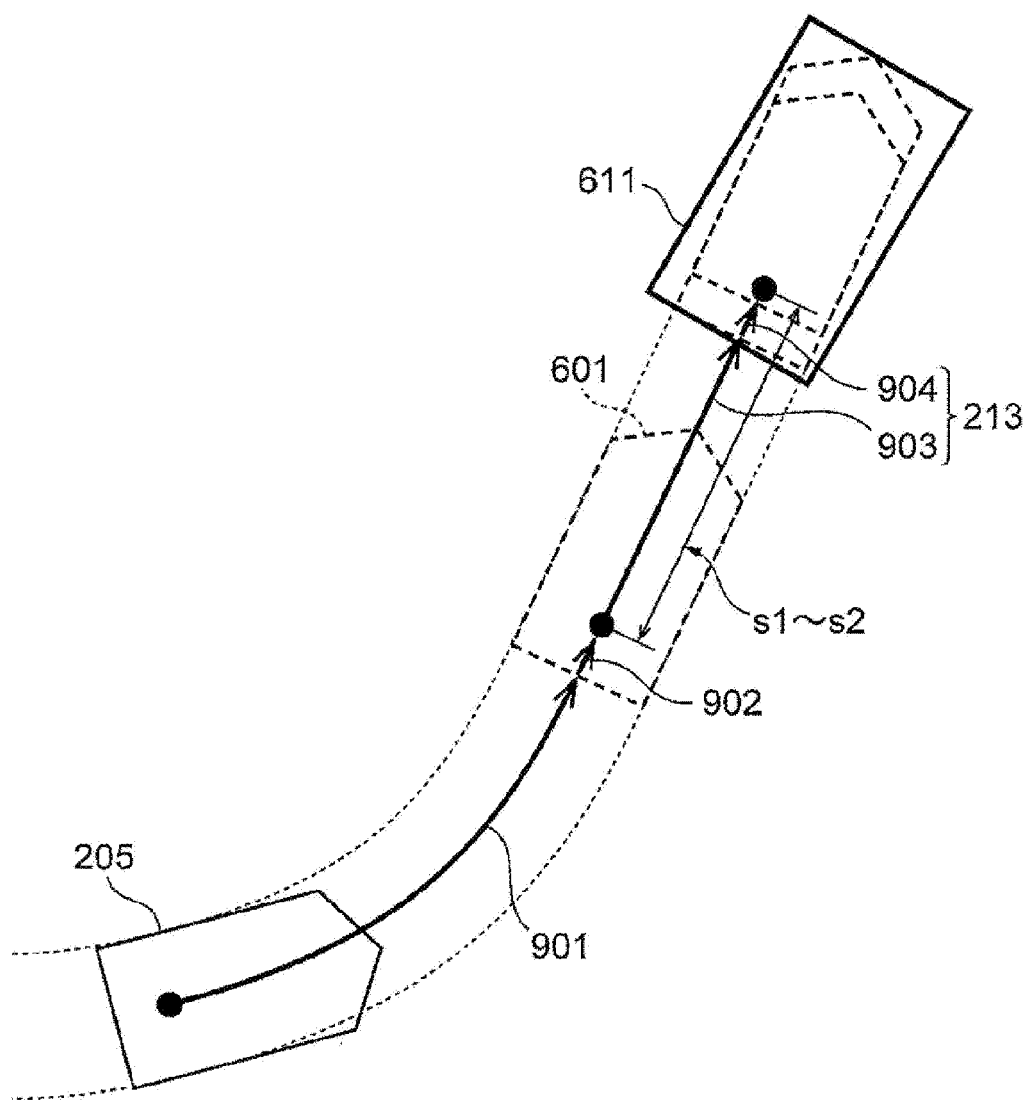
FIG. 11 is a diagram for describing a vehicle control method of maneuvering the host vehicle into the next frame when the next frame is located on the extension of the current section route according to the first embodiment of the present invention.

FIG. 11 is a diagram for describing the vehicle control method of maneuvering the host vehicle into the next frame when the next frame is located on the extension of the current section route according to the first embodiment of the present invention.

Before the host vehicle reaches the adjustment route added by the adjustment unit 163 described above and until the host vehicle reaches a vehicle speed threshold Va set for travel on the adjustment route, travel control is performed in accordance with the initial section route and steering control and vehicle speed scheduled at each position on the section route until the vehicle speed is reduced to Va (section 901).

When the vehicle speed reaches the vehicle speed threshold Va while the host vehicle is in deceleration before finishing traveling on the remaining section of the section route, the travel control is performed up to the initial travel end position 601 in accordance with the initial section route (excluding stationary steering after reaching the next frame) with the vehicle speed (vehicle speed threshold Va) kept (without causing the host vehicle to come to a stop) (section 902).

With the steering angle, vehicle speed, and the like at the travel end point kept from the initial travel end position 601, the travel control is performed up to a position immediately before the distance (s1 to s2) to the next frame 611 (immediately before the end of travel by the adjustment distance) (section 903).

When the vehicle reaches the position immediately before the next frame 611 (distance by which the vehicle can come to a stop without hard braking), the vehicle decelerates (brakes) to come to a stop at the next frame 611 (section 904).

Finally, after the stop at the next frame 611, when the vehicle is scheduled to perform stationary steering on the initial section route after reaching the next frame 611, the vehicle performs the stationary steering.

Note that the vehicle speed threshold Va is set to a speed at which the vehicle can come to a stop within the next frame 611 with an enough margin even when a slight error occurs during deceleration. For example, with Va set equivalent to 1 km/h, the vehicle can come to a stop at a deceleration of about 0.1 G, about 5 cm from the start of deceleration on a dry road surface, or about 10 cm on a wet road surface. Therefore, with Va set to 1 km/h, when the vehicle starts to decelerate 7.5 cm before the next frame 611 at about 0.1 G, the error can be within 2.5 cm even with the feedback control disabled. Needless to say that the feedback control may be used together to increase the accuracy of the stop position.

Figure 12:
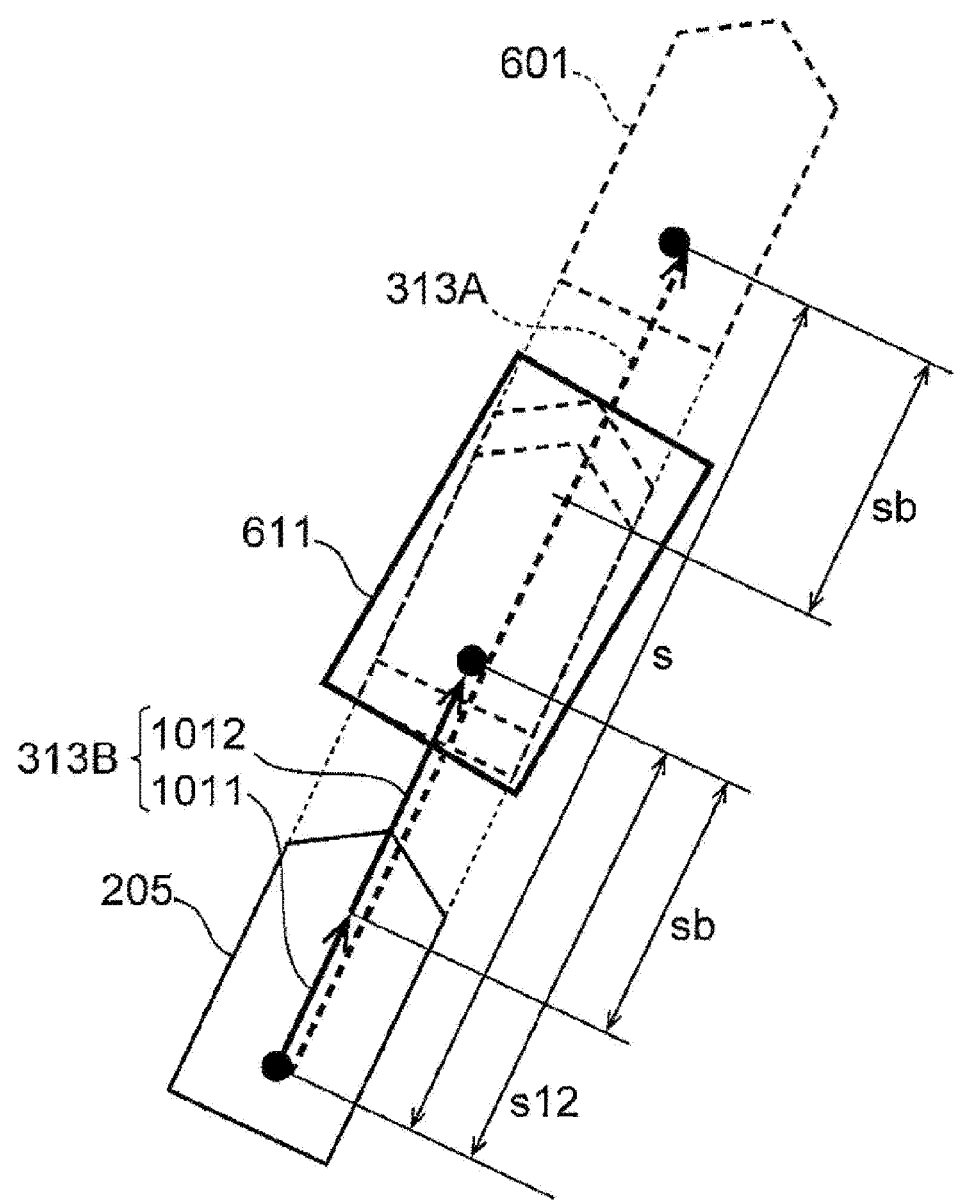
FIG. 12 is a diagram for describing the vehicle control method of maneuvering the host vehicle into the next frame when the next frame is located on the remaining section of the current section route according to the first embodiment of the present invention.

FIG. 12 is a diagram for describing the vehicle control method of maneuvering the host vehicle into the next frame when the next frame is located on the remaining section of the current section route according to the first embodiment of the present invention.

First, a description will be given of a method of determining whether the next frame 611 is located on the remaining section of the current section route as preprocessing before applying this vehicle control.

When the last straight segment or curved segment of the section route is a straight segment (a segment having a predetermined length) or an arc, the determination can be made in almost the same manner as the method of determining whether the next frame 611 is located on the extension of the current section route illustrated in FIG. 9 and FIG. 10. When the determination is made whether the next frame 611 is located on the extension of the current section route, the center of the rear wheel axle at the host vehicle position 601 when the host vehicle has finished traveling on the remaining section is taken as the origin and yaw angle 0. On the other hand, when the determination is made whether the next frame 611 is located on the remaining section of the current section route, the center of the rear wheel axle at the current position 205 of the host vehicle is coordinate-converted as the origin and yaw angle 0, and the determination is made whether the host vehicle can reach the next frame 611 in the same manner.

The range of travel distance s1 to s2 obtained as a result of the determination is a range of travel distance required to reach the next frame 611 from the current position 205 of the host vehicle. When 0<s1≤s2 is satisfied, the next frame 611 is located on the way to the end of the v when the host vehicle travels forward on the remaining section, and the host vehicle can reach the next frame 611 by traveling forward by the distance of from s1 to s2. When s1≤s2<0 is satisfied, the next frame 611 is located on the way to the end of the remaining section when the host vehicle travels backward on the remaining section, and the host vehicle can reach the next frame 611 by traveling backward by the distance of from |s2| to |s1|. When the travel direction at the current position 205 of the host vehicle coincides with the travel direction for reaching the next frame 611, the next frame 611 can be considered as being located on the way to the end of the remaining section of the current section route.

Next, a description will be given of the vehicle control method of maneuvering the host vehicle into the next frame 611 when the next frame 611 is located on the remaining section of the current section route. Herein, for the sake of simplicity, a description will be given only of a case of forward travel, that is, a case where 0<s1≤s2 is satisfied. The same holds true for backward travel. Further, the travel distance to the next frame 611 may be in the range of from s1 to s2, but, herein, s12 is set as the target travel distance (s1≤s12≤s2).

Herein, when deceleration control is performed in accordance with the initial section route and the vehicle speed scheduled at each position on the initial section route, the travel distance from the current position 205 of the host vehicle to the travel end position 601 is denoted as s, and the remaining distance at the start of the deceleration control under which the host vehicle comes to a stop at the travel end position 601 is denoted as sb.

When sb≤s12 is satisfied, the host vehicle travels forward from the current position 205 of the host vehicle by a distance s12−sb without deceleration (section 1011), and then decelerates under the initially scheduled deceleration control (section 1012). That is, in this case, the start of vehicle deceleration is made earlier (than the initially scheduled deceleration) to cause the host vehicle to decelerate earlier.

When s12<sb≤s is satisfied, the host vehicle starts to decelerate at the current position 205 of the host vehicle so as to make the deceleration equal to sb/s12 times the deceleration under the initial deceleration control. That is, in this case, the vehicle deceleration is made higher (than the initially scheduled deceleration) to cause the host vehicle to decelerate earlier. However, when the deceleration under the initial deceleration control multiplied by sb/s12 exceeds an allowable deceleration threshold, a determination is made that the host vehicle cannot come to a stop within the next frame 611, and the adjustment route is prevented from being applied.

When s<sb is satisfied, the host vehicle has already started to decelerate at the current position 205 of the host vehicle, so that the host vehicle decelerates on the remaining s of a deceleration section from the current position 205 of the host vehicle so as to make the deceleration equal to s/s12 times the deceleration under the initial deceleration control. However, when the deceleration under the initial deceleration control multiplied by s/s12 exceeds the allowable deceleration threshold, a determination is made that the host vehicle cannot come to a stop within the next frame 611, and the adjustment route is prevented from being applied.

As described above, according to the present embodiment, when the determination is made whether the next frame is located on the extension of the current section route and the determination result shows that the next frame is located on the extension, the host vehicle is caused to further travel, or when the determination is made whether the next frame is located on the remaining section of the current section route and the determination result shows that the next frame is located on the remaining section, the host vehicle is caused to decelerate earlier, thereby allowing the host vehicle to reach and come to a stop at the next frame.

That is, according to the present embodiment, under automatic parking vehicle control, when the host vehicle position at the end of the vehicle control along the section route is likely to deviate from the next frame, and the next frame is located on the extension of the section route or on the section route, the determination is made whether the host vehicle can reach the next frame with slight adjustment to light-load processing without regeneration of the parking route, and, when the determination result shows that the host vehicle can reach the next frame, vehicle control reflecting the adjustment is performed to allow the host vehicle to reach and properly come to a stop at the next frame. Further, even when it is recognized that the next frame has moved suddenly due to the influence of the external environment recognition or the like, the host vehicle can properly come to a stop at the next frame. In addition, the normal parking route regeneration processing is not performed, thereby eliminating the need of the stop and in turn reducing a processing load on a central processing unit (CPU).

Second Embodiment

Figure 13:
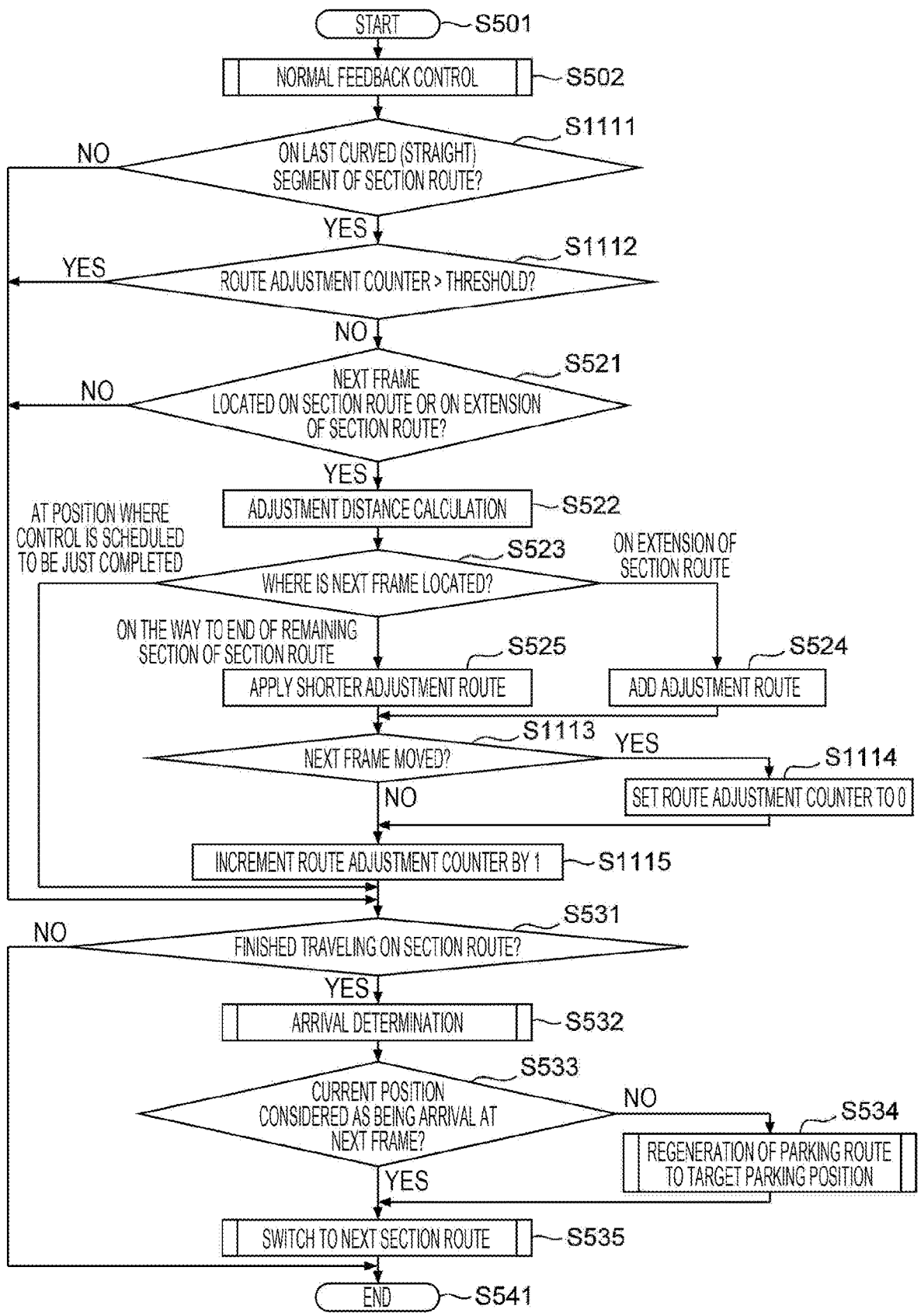
FIG. 13 is a flowchart showing one cycle of cyclic processing in an automatic parking control device when the host vehicle is caused to travel on the current section route under vehicle control according to a second embodiment of the present invention.

FIG. 13 is a flowchart showing one cycle of cyclic processing in an automatic parking control device when the host vehicle is caused to travel on the current section route under vehicle control according to a second embodiment of the present invention.

The operation of the automatic parking control device according to the second embodiment is substantially the same as the operation of the automatic parking control device according to the first embodiment, but is different in that the adjustment operation can be suppressed when arrival adjustment according to the present embodiment is not made as expected although, in exchange for an increase in a load on one cycle processing.

That is, steps S501 and S502 are the same as steps S501 and S502 in the flowchart according to the first embodiment described with reference to FIG. 7. When step S502 is brought to an end, the processing proceeds to step S1111.

In step S1111, a determination is made whether the host vehicle position is located on the last curved segment or straight segment of the section route (that is, immediately before the next frame), and, when the determination result is YES, the processing proceeds to step S1112. When the determination result is NO, the processing proceeds to step S531.

In step S1112, a determination is made whether a newly established route adjustment counter has exceeded a predetermined threshold, and, when the determination result is YES, the processing proceeds to step S531. When the determination result is NO, the processing proceeds to step S521. The route adjustment counter has an initial value of 0 and is reset to the initial value at the start of vehicle control along each section route. The threshold appropriately defined makes it possible to suppress an increase in the number of route adjustments made to the same section route, which in turn makes it possible to prevent logic according to the present embodiment from being wastefully applied numerous times in an abnormal situation where the host vehicle cannot reach the next frame even with numerous times of adjustments.

Steps S521, S522, S523, S524, and S525 are the same as steps S521, S522, S523, S524, and S525 in the flowchart according to the first embodiment described with reference to FIG. 7. When step S524 or step S525 is brought to an end, the processing proceeds to step S1113.

In step S1113, a determination is made whether the next frame has moved immediately before the execution of the current cycle of processing, and, when the determination result shows that the next frame has moved, the route adjustment counter is reset to 0 (step S1114). This is because, due to the movement of the next frame, it is considered that the application of the route adjustment is a normal operation. When the determination result in step S1113 shows that the next frame has not moved and after execution of step S1114, the processing proceeds to step S1115.

In step S1115, the route adjustment counter is incremented by one, and the processing proceeds to step S531.

Steps S531, S532, S533, S534, S535, and S541 are the same as steps S531, S532, S533, S534, S535, and S541 in the flowchart according to the first embodiment described with reference to FIG. 7.

That is, according to the present embodiment, the determination unit 161 determines that the host vehicle can reach within the next frame, the determination by the determination unit 161 and the calculation by the calculation unit 162 are made again while causing the host vehicle to travel on the adjustment route generated in accordance with the adjustment distance obtained from the calculation unit 162, and when the determination that the host vehicle can reach within the next frame is repeated a predetermined number of times or more due to causing the host vehicle to further travel or causing the host vehicle to decelerate earlier even without a change in position of the next frame indicated by a result of the determination made again by the determination unit 161 and a result of the calculation made again by the calculation unit 162, the adjustment unit 163 does not readjust the adjustment route. This makes it possible to not only obtain the same actions and effect as those of the first embodiment, but also disable the adjusting operation when the arrival adjustment by the arrival adjustment unit 160 does not operate as expected.

Note that the present invention is not limited to the above-described embodiments and includes but includes various modifications. For example, the above-described embodiments have been described in detail to facilitate the understanding of the present invention and are not intended to indicate that all the above-described components need to be always provided. Further, some of the components of one embodiment can be replaced with corresponding components of another embodiment, and a component of another embodiment can be added to the components of one embodiment. Further, it is possible to add different components to the components of each embodiment, delete some of the components of each embodiment, and replace some of the components of each embodiment with different components.

Further, some or all of the components, functions, processing units, processing means, and the like described above may be implemented by hardware such as an integrated circuit designed to implement some or all of the components, functions, processing units, processing means, and the like. Further, each of the components, functions, and the like described above may be implemented by software that causes the processor to interpret and execute a program that makes each function work. Information such as a program, a table, and a file for making each function work may be stored in a memory, a hard disk, a storage device such as a solid state drive (SSD), or a recording medium such as an IC card, an SD card, or a DVD.

Further, control lines and information lines considered necessary for the description are only illustrated, and all the control lines and information lines necessary for the product are not necessarily illustrated. In practice, it may be considered that almost all the components are mutually connected.

REFERENCE SIGNS LIST 100 automatic parking control device
101 automatic parking software
110 state transition unit
120 input and output processing unit
125 display processing unit
130 space recognition unit
135 route generation unit
140 arrival determination unit
145 host vehicle position estimation unit
150 vehicle control unit
160 arrival adjustment unit
161 determination unit
162 calculation unit
163 adjustment unit
171 HMI
172 external environment recognition sensor
173 input switch
180 various sensor and actuator ECU
190 vehicle control network
201 parking start position (vehicle control start position)
202 turning position
203A target parking position (before change)
203B target parking position (after change)
205 current position of host vehicle
211 parking route
212 section route
213 adjustment route
313A section route of remaining section (before adjustment)
313B section route of remaining section (after adjustment)
601 travel end position of remaining section
611 next frame

The invention claimed is:

1. An automatic parking control device that causes a vehicle to travel from a parking start position to a target parking position comprising:
a determination unit configured to determine, while the vehicle is traveling on a first section route, whether the vehicle can reach a turning position which the vehicle is scheduled to reach next when the vehicle travels on a remaining portion of the first section route, and, when determining that the vehicle cannot reach the turning position, determine whether the vehicle can reach the turning position on an extension of the remaining portion;
a calculation unit configured to calculate an adjustment distance from the current position on the first section route when the determination unit determines that the vehicle cannot reach the turning position; and
an adjustment unit configured to generate, based on the adjustment distance calculated by the calculation unit, an adjustment route on which the vehicle is caused to travel.

2. An automatic parking control device that causes a vehicle to travel from a parking start position to a target parking position comprising:
a determination unit configured to determine whether the vehicle can reach a turning position which the vehicle is scheduled to reach next when the vehicle travels on a remaining portion of a current section route, and, when determining that the vehicle cannot reach the turning position, determine whether the vehicle can reach the turning position on an extension of the remaining portion by causing the vehicle to travel further from a travel end position of the remaining section without changing a steering angle and travel direction of the current section;
a calculation unit configured to calculate an adjustment distance from the current position on the section route when the determination unit determines that the vehicle cannot reach the turning position; and
an adjustment unit configured to generate, based on a calculation result from the calculation unit, an adjustment route on which the vehicle is caused to travel by adding an adjustment distance to the current section route without changing the steering angle and travel direction.

3. The automatic parking control device according to claim 2,
wherein with the vehicle caused to travel from a travel end position of the current section route to a next frame, when a speed of the vehicle reaches a predetermined threshold during deceleration before completion of travel to the end of the current section route, the vehicle is caused to travel with the vehicle speed kept equal to the predetermined threshold.

4. An automatic parking control device that causes a vehicle to travel from a parking start position to a target parking position comprising:
a determination unit configured to determine whether the vehicle can reach a turning position which the vehicle is scheduled to reach next when the vehicle travels on a remaining portion of a first section route from a current position on the first section route, and, when determining that the vehicle cannot reach the turning position determine whether the vehicle can reach the turning position within a next frame;
a calculation unit configured to calculate an adjustment distance from the current position on the first section route to the next frame when the determination unit determines that the vehicle can reach the turning position within the next frame; and
an adjustment unit configured to generate, based on a calculation result from the calculation unit, an adjustment route on which the vehicle is caused to travel on the remaining portion of the first section route such that the vehicle can to come to a stop within the next frame.

5. The automatic parking control device according to claim 4, wherein the vehicle is caused to come to a stop within the next frame by increasing deceleration of the vehicle higher or making a start of deceleration of the vehicle earlier to cause the vehicle to decelerate earlier.

6. The automatic parking control device according to claim 1, wherein the first section route is formed of a chain of at least one curved segment represented by a first mathematical expression or one straight segment represented by a second mathematical expression, and
the determination by the determination unit and the calculation by the calculation unit are made when the vehicle is located on the curved segment or straight segment, said curved segment or said straight segment being located immediately before the next frame.

7. The automatic parking control device according to claim 6, wherein the curved segment located immediately before the next frame is an arc.

8. The automatic parking control device according to claim 1, wherein the determination by the determination unit and the calculation by the calculation unit are made when a position of a next frame is changed.

9. The automatic parking control device according to claim 1, wherein, when the determination unit determines that the vehicle cannot reach the turning point within a next frame a route to the target parking position is regenerated.

10. The automatic parking control device according to claim 1, wherein, when the determination unit determines that the vehicle can reach the turning point within a next frame,
and when the determination by the determination unit and the calculation by the calculation unit have been made more than once while causing the vehicle to travel on the adjustment route generated in accordance with the adjustment distance obtained from the calculation unit,
when the determination that the vehicle can reach the turning spot within the next frame is repeated a predetermined number of times, the adjustment unit does not readjust the adjustment route further.

* * * * *